US010765091B2

(12) United States Patent
Miyahara et al.

(10) Patent No.: US 10,765,091 B2
(45) Date of Patent: Sep. 8, 2020

(54) INFORMATION PROCESSING DEVICE AND INFORMATION PROCESSING METHOD

(71) Applicant: SONY CORPORATION, Tokyo (JP)

(72) Inventors: Masanori Miyahara, Tokyo (JP); Takashi Ogata, Tokyo (JP); Masataka Shinoda, Kanagawa (JP); Nobuhiro Kihara, Aichi (JP)

(73) Assignee: SONY CORPORATION, Tokyo (JP)

( * ) Notice: Subject to any disclaimer, the term of this patent is extended or adjusted under 35 U.S.C. 154(b) by 84 days.

(21) Appl. No.: 16/076,483

(22) PCT Filed: Nov. 29, 2016

(86) PCT No.: PCT/JP2016/085442
§ 371 (c)(1),
(2) Date: Aug. 8, 2018

(87) PCT Pub. No.: WO2017/141521
PCT Pub. Date: Aug. 24, 2017

(65) Prior Publication Data
US 2019/0045751 A1    Feb. 14, 2019

(30) Foreign Application Priority Data

Feb. 16, 2016   (JP) ................................. 2016-027085

(51) Int. Cl.
*A01K 29/00*   (2006.01)
*G06Q 50/02*   (2012.01)
(Continued)

(52) U.S. Cl.
CPC .......... *A01K 29/005* (2013.01); *B64C 39/024* (2013.01); *G06K 9/78* (2013.01);
(Continued)

(58) Field of Classification Search
None
See application file for complete search history.

(56) References Cited

U.S. PATENT DOCUMENTS 10,045,511 B1 * 8/2018 Yarden ................. A01K 29/005
2008/0147458 A1 * 6/2008 Yamazaki ............ A01K 11/008
705/7.11

(Continued)

FOREIGN PATENT DOCUMENTS

EP       2832217 A1     2/2015
JP       09-107840 A    4/1997
(Continued)

OTHER PUBLICATIONS

Hannoe, et al., "Utilizing of Agricultural IT for Dairy", 09 pages.
(Continued)

*Primary Examiner* — Fayyaz Alam
(74) *Attorney, Agent, or Firm* — Chip Law Group

(57) ABSTRACT

Provided is an information processing device that includes a display control unit that controls display of condition information indicating conditions of livestock, an acquisition unit that acquires task information indicating a task related to the livestock, which is based on the condition information, and an output unit that outputs command information that indicates a command for the task indicated by the task information.

15 Claims, 12 Drawing Sheets

(51) Int. Cl.
G06Q 10/06 (2012.01)
B64C 39/02 (2006.01)
G06K 9/78 (2006.01)

(52) U.S. Cl.
CPC ....... *G06Q 10/06311* (2013.01); *G06Q 50/02* (2013.01); *B64C 2201/123* (2013.01); *B64C 2201/127* (2013.01); *B64C 2201/145* (2013.01)

(56) References Cited

U.S. PATENT DOCUMENTS

| 2011/0161838 | A1 | 6/2011 | Kang et al. | |
| 2014/0338447 | A1* | 11/2014 | Sharpe | A01K 29/005 73/431 |
| 2015/0282457 | A1* | 10/2015 | Yarden | A01K 29/005 340/573.2 |
| 2016/0125276 | A1* | 5/2016 | Spicola, Sr. | A01K 11/008 382/110 |
| 2016/0135426 | A1* | 5/2016 | Harty | A61B 5/1114 340/573.3 |
| 2016/0307373 | A1* | 10/2016 | Dean | G06T 19/006 |

FOREIGN PATENT DOCUMENTS

| JP | 10-083462 A | 3/1998 |
| JP | 2008-148569 A | 7/2008 |
| WO | 2013/145304 A1 | 10/2013 |
| WO | 2014/042519 A1 | 3/2014 |
| WO | 2014/197631 A1 | 12/2014 |
| WO | 2015/103689 A1 | 7/2015 |

OTHER PUBLICATIONS

"Research Report on the Use of Sensor Network", Next Generation Electronic Commerce Promotion Council of Japan, Mar. 2008, 09 pages.
Masamoto, et al., "Trends Toward Adoption of IT in Stockbreeding", 12 pages.
Extended European Search Report of EP Patent Application No. 16890658.4, dated Oct. 12, 2018, 08 pages.
Masamoto, et al., "Trends Toward Adoption of IT in Stockbreeding", 1st edition, The Nikkan Kogyo Shinbun, Ltd. Haruhiro Imizu, Oct. 27, 2011, pp. 102-109.
"Research Report on the Use of Sensor Network", 1st edition, Next Generation Electric Commerce Promotion Council of Japan, Mar. 31, 2008, pp. 61-67.
Hannoe, et al., "Utilizing of Agricultural IT for Dairy", NTT Energy and Environment Systems Laboratories, Jan. 1, 2003, vol. 15, Issue 1, pp. 57-60.
International Search Report and Written Opinion of PCT Application No. PCT/JP2016/085442, dated Jan. 31, 2017, 08 pages of English Translation and 07 pages of ISRWO.
International Preliminary Report on Patentability of PCT Application No. PCT/JP2016/085442, dated Aug. 30, 2018, 08 pages of English Translation and 04 pages of IPRP.

* cited by examiner

FIG. 4

| START TIME | END TIME | ACQUISITION LOCATION | CATTLE ID | ACQUISITION MEANS | MEANS DETAILS | CONDITION INFORMATION | CONDITION DETAILS |
|---|---|---|---|---|---|---|---|
| 2015/12/14 12:35 | 2015/12/14 12:37 | (35.631166, 139.743612) | 0116 | SENSOR ATTACHED TO LIVESTOCK | SOUND DETECTION | HIGH-TONE CALL SOUND | (raw data: VOICE FILE) |
| 2015/12/14 12:35 | 2015/12/14 12:37 | (35.631166, 139.743612) | 0116 | SENSOR ATTACHED TO LIVESTOCK | WALKING DETECTION | NORMAL WALKING | (raw data: ACCELERATION FILE) |
| 2015/12/14 12:55 | 2015/12/14 12:55 | (35.631166, 139.743612) | 0269 | FARM OPERATOR A | SUBJECTIVITY | ABNORMAL WALKING | "ONE OF CATTLE SEEMS TO DRAG ITS RIGHT LEG" |
| 2015/12/14 16:29 | 2015/12/14 17:52 | (35.631166, 139.743612) | 0241 | DRONE A | CAMERA | — | (raw data: IMAGE FILE) |
| 2015/12/14 16:29 | 2015/12/14 17:52 | (35.631166, 139.743612) | 0263 | DRONE A | INFRARED CAMERA | SLIGHTLY HIGH FEVER | (raw data: TEMPERATURE FILE) |
| 2015/12/14 18:00 | 2015/12/14 18:00 | | 0116 | INFORMATION PROCESSING DEVICE (PREDICTION MODEL) | MATING SEASON DETERMINATION | THERE IS POSSIBILITY OF MATING SEASON | 75.3% |
| 2015/12/14 18:00 | 2015/12/14 18:00 | | 0263 | DIAGNOSIS BY VETERINARY | DISEASE DETERMINATION | THERE IS POSSIBILITY OF DISEASE | SUSPICION OF INFECTIOUS DISEASE |
| ... | ... | ... | ... | ... | ... | ... | ... |

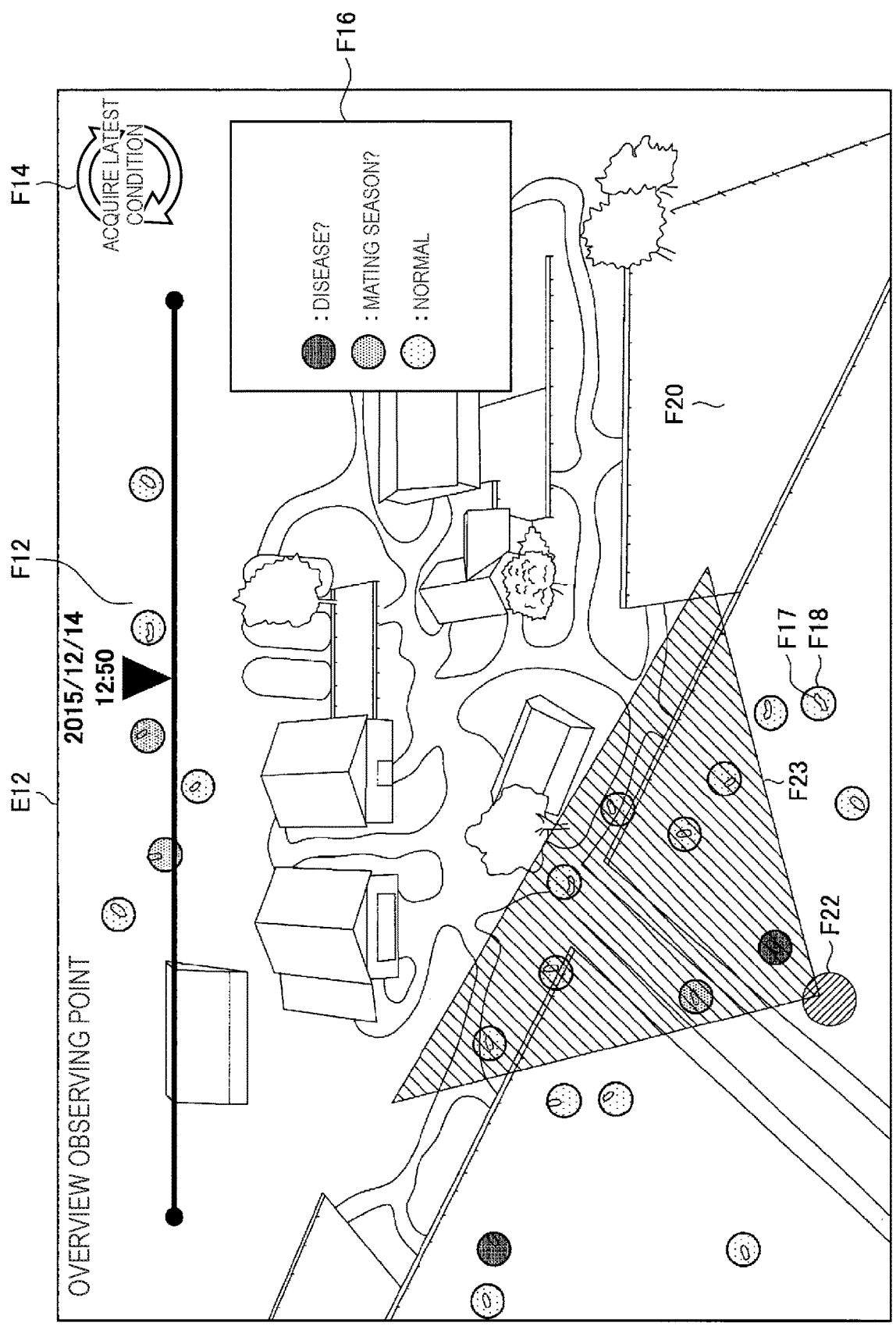

FIG. 7

| COMMAND START TIME | TASK COMPLETION TIME | STATUS | COMMAND SUBJECT | COMMAND TARGET | COMMAND INFORMATION ||||
|---|---|---|---|---|---|---|---|
| | | | | | TASK TARGET | TASK TYPE | TASK DETAILS |
| 2015/12/14 12:35 | | UNFINISHED | FARM MANAGER A | FARM WORKER A | ONE OF CATTLE (0134) | MOVE TARGET | MOVE TARGET ONE OF CATTLE TO BARN (WITHIN 15 MINUTES) |
| 2015/12/14 15:45 | 2015/12/14 15:50 | COMPLETED | FARM MANAGER A | SENSOR ATTACHED TO LIVESTOCK | ALL CATTLE | ACQUIRE POSITION INFORMATION | ACQUIRE CURRENT POSITION INFORMATION OF CATTLE |
| 2015/12/14 16:15 | | UNFINISHED | INFORMATION PROCESSING DEVICE (COMMAND INFORMATION GENERATION UNIT) | DRAW A | ONE OF CATTLE (0263) | IMAGE APPEARANCE OF TARGET | IMAGE APPEARANCE OF TARGET ONE OF CATTLE FROM ALL ORIENTATIONS |
| ... | ... | ... | ... | ... | ... | ... | ... |

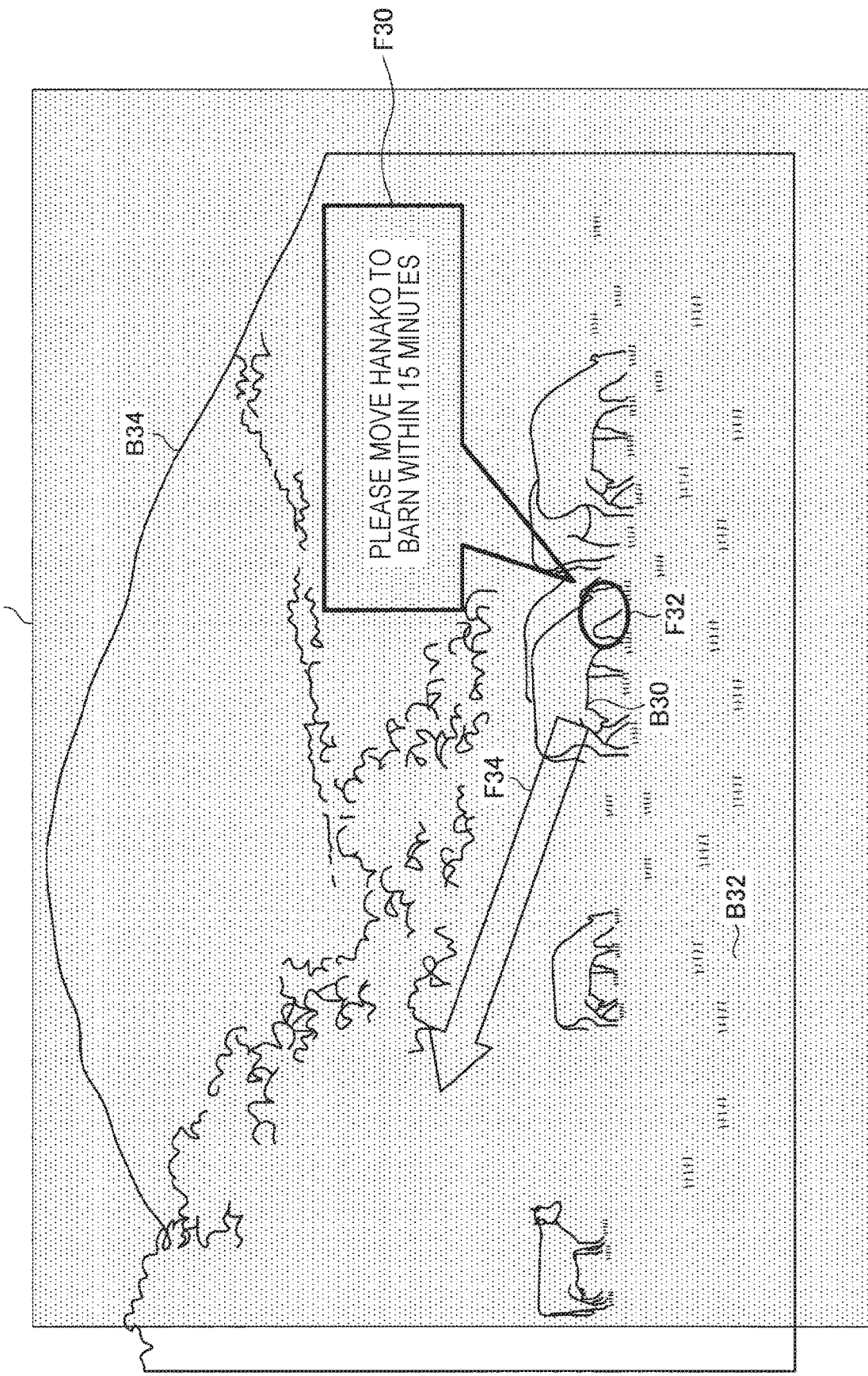

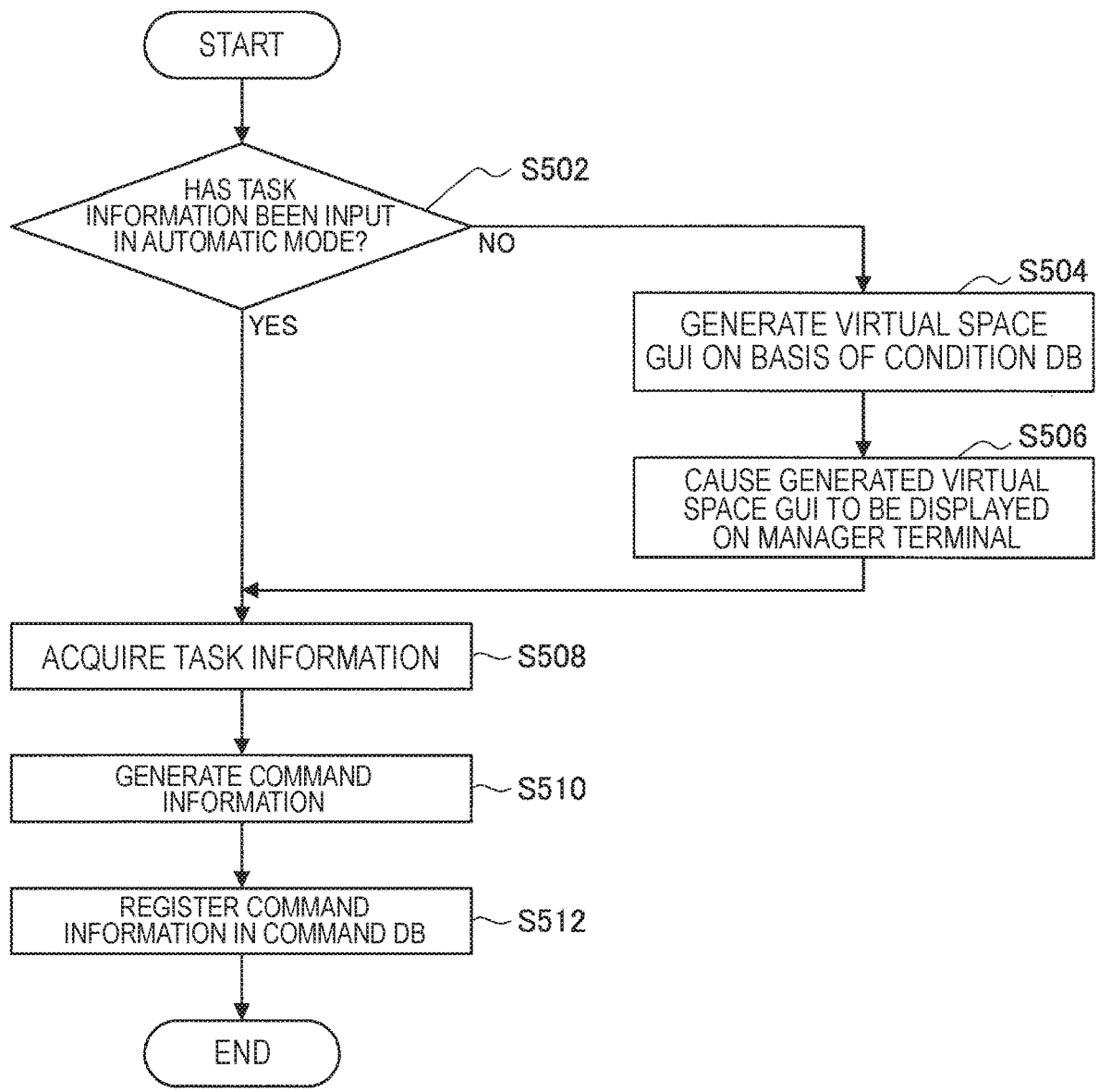

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/085442 filed on Nov. 29, 2016, which claims priority benefit of Japanese Patent Application No. JP 2016-027085 filed in the Japan Patent Office on Feb. 16, 2016. Each of the above-referenced applications is hereby incorporated herein by reference in its entirety.

TECHNICAL FIELD

The present disclosure relates to an information processing device, an information processing method, and a program.

BACKGROUND ART

In recent years, technologies for managing livestock have been proposed. For example, Patent Literature 1 proposes a technology of generating a barn map including livestock position information in order to reduce a personnel burden.

CITATION LIST

Patent Literature

Patent Literature 1: WO 2014/042519

DISCLOSURE OF INVENTION

Technical Problem

Incidentally, it is considered to be desirable to further improve efficiency of livestock management in the fields related to livestock management. For example, it is necessary for an operator who performs tasks for livestock management to appropriately determine tasks to be executed in accordance with actual conditions of livestock. The aforementioned determination on the tasks to be executed made by the operator can be a cause of an increase in a personnel burden in livestock management.

Thus, the present disclosure proposes a new and enhanced information processing device, information processing method, and program capable of further improving the efficiency of livestock management.

Solution to Problem

According to the present disclosure, there is provided an information processing device including: a display control unit that controls display of condition information indicating conditions of livestock; an acquisition unit that acquires task information indicating a task related to the livestock, which is input on a basis of the condition information; and an output unit that outputs command information for providing a command for the task indicated by the task information.

In addition, according to the present disclosure, there is provided an information processing method including: controlling, by an information processing device, display of condition information indicating conditions of livestock; acquiring task information indicating a task related to the livestock, which is input on a basis of the condition information; and outputting command information for providing a command for the task indicated by the task information.

In addition, according to the present disclosure, there is provided a program causing a computer to function as: a display control unit that controls display of condition information indicating conditions of livestock; an acquisition unit that acquires task information indicating a task related to the livestock, which is input on a basis of the condition information; and an output unit that outputs command information for providing a command for the task indicated by the task information.

Advantageous Effects of Invention

According to the present disclosure, it is possible to improve efficiency of livestock management as described above.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram illustrating an example of a data table in a condition database.

FIG. 5 is an explanatory diagram illustrating an example of an overview observing point screen displayed on a manager terminal.

FIG. 7 is an explanatory diagram illustrating an example of a data table in a command database.

FIG. 8 is an explanatory diagram illustrating an example of an overlaid screen displayed on an operator terminal.

FIG. 9 is a flowchart illustrating an example of a flow of processing of acquiring command information, which is performed by the information processing device according to the embodiment.

MODE(S) FOR CARRYING OUT THE INVENTION

Figure 1:
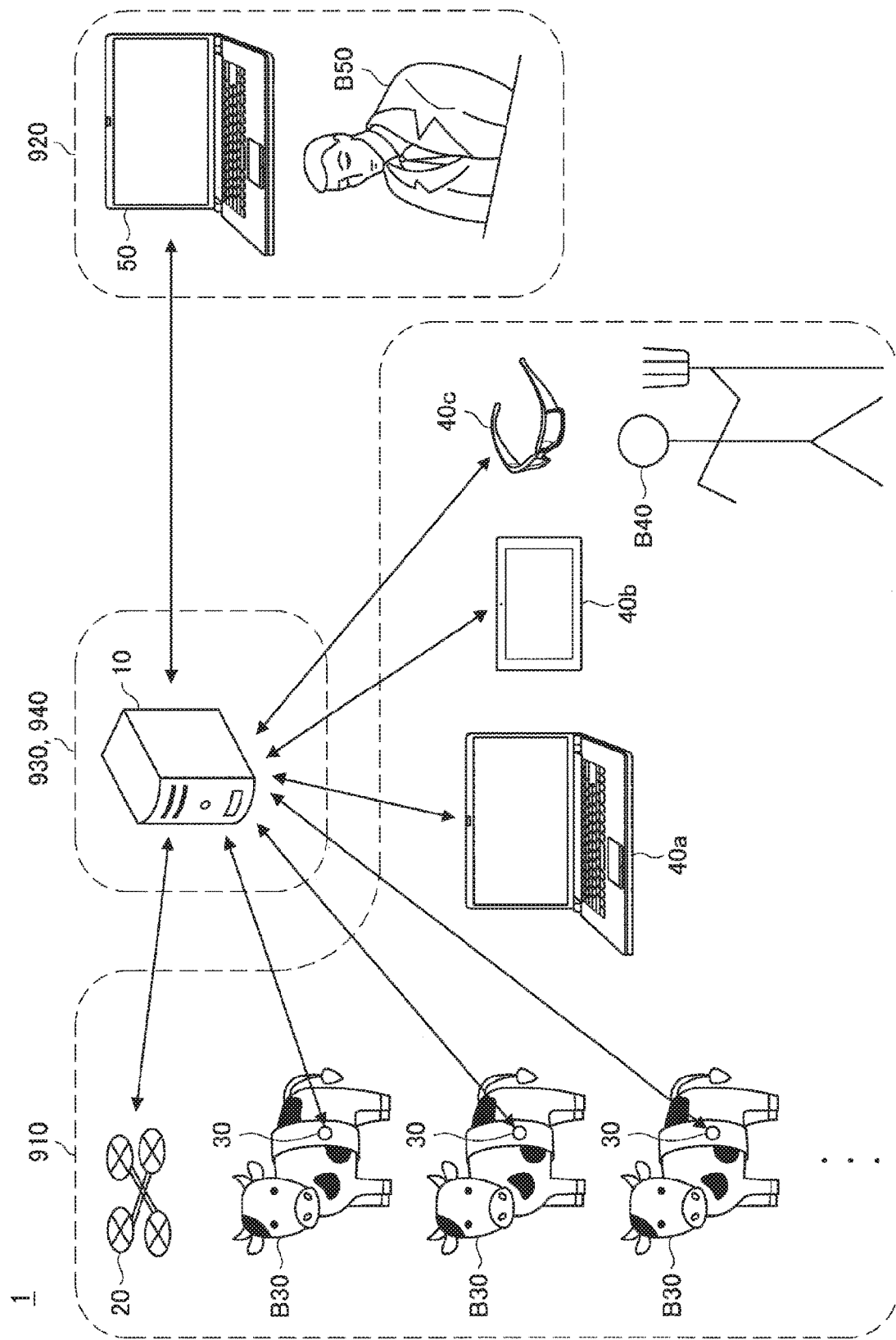
FIG. 1 is an explanatory diagram illustrating an example of a system configuration of a farm management system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that description will be given in the following order.
1. Farm management system
2. Functional configuration of information processing device
2-1. Communication unit
2-2. Storage unit
2-3. Control unit
3. Operations
3-1. Processing of acquiring command information
3-2. Processing of outputting command information
3-3. Farm management processing
4. Hardware configuration
5. Conclusion <1. Pasture Management System>

First, a system configuration of a farm management system 1 according to an embodiment of the present disclosure will be described with reference to FIGS. 1 and 2. The farm management system 1 according to the embodiment is an example of a system for managing a farm in which cattle B30 are raised. The cattle B30 are just an example of livestock in the farm management system including an information processing device according to the present disclosure, and swine, horses, birds, or the like may be applied as the livestock.

FIG. 1 is an explanatory diagram illustrating an example of a system configuration of the farm management system 1 according to the embodiment. As illustrated in FIG. 1, the farm management system 1 includes an information processing device 10, a drone 20, sensors 30, operator terminals 40, and a manager terminal 50. Each of the drone 20, the sensors 30, the operator terminals 40, and the manager terminal 50 communicates with the information processing device 10 via a wired or wireless information network.

Note that although one drone 20, three sensors 30, three operator terminals 40, and one manager terminal 50 for one information processing device 10 are illustrated in FIG. 1, the respective numbers of the drones 20, the sensors 30, the operator terminals 40, and the manager terminals 50 that communicate with one information processing device 10 may be numbers that are different from the numbers illustrated in FIG. 1. In addition, the respective numbers of the cattle B30, operators B40, and managers B50 may be numbers that are different from the numbers illustrated in FIG. 1.

The drone 20 is an example of a mobile object. The drone 20 is an unmanned flying object configured to be able to automatically fly on the basis of a designated flight route. The drone 20 operates on the basis of an operation instruction from the information processing device 10, for example. Specifically, the drone 20 operates on the basis of command information in a case in which the command information is output from the information processing device 10 to the drone 20. The command information is information for providing a command for a task related to the cattle B30.

The drone 20 can fly using four rotors, for example, and can fly while going upward and downward or moving horizontally by controlling rotation of the respective rotors. It is a matter of course that the number of rotors is not limited to such an example. The flight route from a flight start position to a flight end position set for the drone 20 is set as position information indicated by a global navigation satellite system (GNSS) signal from a GNSS satellite (for example, a global positioning system (GPS) signal from a GPS satellite), for example. Therefore, specifically, a GPS receiver that receives radiowaves from a GPS satellite and calculates a current position can be incorporated in the drone 20.

In addition, the drone 20 may transmit various kinds of information to the information processing device 10. For example, the drone 20 may include an imaging device including imaging elements such as a lens, a CCD image sensor, and a CMOS image sensor, a flash, and the like and may transmit an image obtained by imaging processing performed by the imaging device to the information processing device 10.

For example, the drone 20 may transmit an image, which is obtained by imaging the cattle B30, in which the entire cattle B30 appear, to the information processing device 10. Also, the drone 20 may transmit an image, which is obtained by imaging a part of the cattle B30, in which the part appears, to the information processing device 10. The image transmitted from the drone 20 is used for processing performed for farm management by the information processing device 10. The image corresponds to the condition information indicating the condition of the cattle B30.

Note that the drone 20 may generate various kinds of information by performing image processing on the image obtained by the image capturing and may transmit the generated information to the information processing device 10. The information generated by the image processing also corresponds to the condition information indicating the condition of the cattle B30.

Each sensor 30 is provided for each of the cattle B30, detects various physical amounts related to the corresponding one of the cattle B30, and transmits detection results. The sensor 30 may perform the detection of the physical amounts and the transmission of the detection results at a preset time. In addition, in a case in which the command information is output from the information processing device 10 to the sensor 30, the sensor 30 may operate on the basis of the command information.

The sensor 30 may be attached to the corresponding one of the cattle B30, for example. The detection results transmitted from the sensor 30 are received by the information processing device 10 and are used in processing performed for farm management by the information processing device 10. The detection results correspond to the condition information indicating the condition of the cattle B30. Note that the sensor 30 may be mounted on the drone 20, and in that case, the drone 20 can transmit the detection results obtained by the detection performed by the sensor 30 to the information processing device 10.

The information transmitted as the detection results from the sensor 30 include body condition information related to body conditions of the cattle B30, for example. The body condition information includes information indicating pulse rates, sweating amounts, body temperatures, body weights, volumes, blood pressures, or skin conditions of the cattle B30, for example. The pulse rates, the sweating amounts, the body temperatures, the body weights, the volumes, the blood pressures, and the skin conditions of the cattle B30 can be detected by applying, as the sensor 30, a sensor capable of detecting the pulse rates, the sweating amounts, the body temperatures, the body weights, the volumes, the blood pressures, and the skin conditions, respectively, for example.

The information transmitted as the detection results from the sensor 30 may include action information related to actions of the cattle B30. The action information may include information indicating which actions the cattle B30 are taking. The actions of the cattle B30 that can be detected by the sensor 30 include chewing, making a sound, movement, excretion, or sleeping, for example. The actions performed by the cattle B30 can be detected by utilizing some or all of a sound sensor capable of detecting sound, an odor sensor capable of detecting odor, a GPS receiver capable of detecting the positions of the cattle B30, and an acceleration sensor, a gyro sensor, and a geomagnetic sensor capable of detecting motions of the cattle B30, as the sensors 30, for example. In addition, the action information may include detailed information regarding actions detected as the actions performed by the cattle B30. The sensor 30 can acquire, as the detailed information, chewing speeds, the details of sounds made, moving speeds, excretion frequencies, or sleeping frequencies, for example. In addition, the detailed information can be detected by utilizing the aforementioned sensors as the sensor 30.

Note that the action information may be generated by the drone 20 capturing an image and performing image processing on the obtained image, and in that case, the generated action information can be transmitted from the drone 20 to the information processing device 10. For example, the information indicating which of actions the cattle B30 are taking can be generated by the drone 20 imaging the entire cattle B30 and performing the image processing on the obtained image. In addition, detailed information regarding chewing or voice making can be generated by the drone 20 imaging mouths of the cattle B30 and performing image processing on the obtained images. In addition, detailed information regarding movement of the cattle B30 can be generated by the drone 20 imaging the legs of the cattle B30 and performing image processing on the obtained images.

The information transmitted as the detection results from the sensor 30 may include position information of the positions of the cattle B30. The positions of the cattle B30 can be detected by applying a GPS receiver as the sensor 30, for example. Note that the position information may include information indicating a range in which the cattle B30 have moved in a predetermined period of time. The information can be calculated from a movement history of the cattle B30.

Note that the position information may be generated by the drone 20 imaging the entire cattle B30 and performing image processing on the obtained image, and in that case, the position information generated by the drone 20 can be transmitted to the information processing device 10.

In addition, the sensor 30 may transmit the detected physical amounts as the detection results directly to the information processing device 10 or may transmit information, which is obtained by performing arithmetic processing on the detected physical amounts, as the detection results to the information processing device 10.

The operator terminal 40 is an example of the communication device that is used by a farm operator B40 who is a user mainly in order to notify the operator B40 of the command information output from the information processing device 10. The operator terminal 40 has a function of communicating with an external device, a function of displaying a screen, a function of outputting voice, and a function of receiving inputs from the operator B40. The above functions of the operator terminal 40 may be realized by the respective devices. For example, FIG. 1 illustrates an example in which a personal computer, a smartphone, and a head mounted display are applied as operator terminals 40*a*, 40*b*, and 40*c*, respectively.

The operator terminal 40 notifies the operator B40 of the command information by displaying the received command information, for example. Here, the operator terminal 40*c* that is a head mounted display is utilized under a condition in which the operator terminal 40*c* is mounted on the head of the operator B40. The operator terminal 40*c* can display a screen in a manner in which the screen is overlaid on at least a part of the field of view of the operator B40. The operator terminal 40*c* may display the received command information in a manner in which the command information is overlaid on at least a part of the field of view of the operator B40.

Note that the notification of the command information provided to the operator B40 by the operator terminal 40 may be realized by a method other than a display of a screen. For example, the operator terminal 40 may notify the operator B40 of the command information by outputting the received command information as voice.

In addition, the operator terminal 40 may transmit information input by the operator B40 to the information processing device 10. The operator terminal 40 may include at least one of a mouse, a keyboard, a touch panel, a button, a microphone, a switch, and a lever, for example, as an input device that receives inputs from the operator B40. In addition, the operator terminal 40 may include a device capable of distinguishing a gesture of the operator B40 in order to receive a gesture of the operator B40 as an input. For example, the operator terminal 40 may transmit the condition information such as the body condition information of the cattle B30 input from the operator B40 to the information processing device 10. The information transmitted from the operator terminal 40 is used in processing performed for farm management by the information processing device 10.

The manager terminal 50 is mainly used by a manager B50 of the farmer in order to input task information indicating a task provided as a command to a device such as the drone 20 or the operator terminal 40. The manager terminal 50 has a function of communicating with an external device, a function of displaying the screen, a function of outputting voice, and a function of receiving inputs from the manager B50, for example. The above functions of the manager terminal 50 can be realized by a personal computer, a smartphone, or a head mounted display, for example.

The manager terminal 50 may display an input screen for receiving an input of task information. The manager terminal 50 displays condition information indicating the conditions of the cattle B30 received from the information processing device 10 on the input screen, for example. In this manner, the manager B50 can decide an appropriate task in accordance with the actual conditions of the cattle B30. The manager B50 inputs the task information on the basis of the condition information. Then, the manager terminal 50 transmits the task information input on the basis of the condition information to the information processing device 10. The task information is used in the processing performed for the farm management by the information processing device 10.

The manager terminal 50 may display a virtual space in a manner in which the positions of the cattle B30 in a real space are associated with the positions of the cattle B30 in the virtual space, for example. In this manner, the manager B50 can decide a task in accordance with a more intuitive operation. In addition, the manager B50 can decide a more appropriate task on the basis of the position information of the cattle B30.

Note that the inputs of task information provided to the manager terminal 50 by the manager B50 may be realized by an operation performed via the input screen or may be realized by another method. In addition, the manager terminal 50 may include at least one of a mouse, a keyboard, a touch panel, a button, a microphone, a switch, and a lever, for example, as an input device that receives inputs from the manager B50. In addition, the manager terminal 50 may include a device capable of distinguishing a gesture of the manager B50 in order to receive a gesture of the manager B50 as an input.

The information processing device 10 performs various kinds of processing for farm management. Specifically, the information processing device 10 controls operations of external devices such as the drone 20 and the sensor 30 and screen display performed by the operator terminal 40 and the manager terminal 50 for farm management. For example, the information processing device 10 causes the condition information received from the drone 20, the sensor 30, or the operator terminal 40 to be displayed on the manager terminal 50. In addition, the information processing device 10 acquires task information input by the manager B50 on the basis of the condition information from the manager terminal 50. In addition, the information processing device 10 outputs the command information for providing a command for the task indicated by the task information to the drone 20, the sensor 30, or the operator terminal 40. In this manner, the task related to the cattle B30 is executed by the drone 20, the sensor 30, or the operator B40.

The information processing device 10 according to the embodiment controls display of the condition information indicating the conditions of the cattle B30, acquires the task information indicating a task related to the cattle B30 input on the basis of the condition information, and outputs the command information for providing a command for the task indicated by the task information. In this manner, it is possible to realize execution of an appropriate task in accordance with the actual conditions of the cattle B30 while reducing a personnel burden. Therefore, according to the information processing device 10 of the embodiment, it is possible to further improve the efficiency of the management of the cattle B30. Note that details of the information processing device 10 will be described later.

Figure 2:
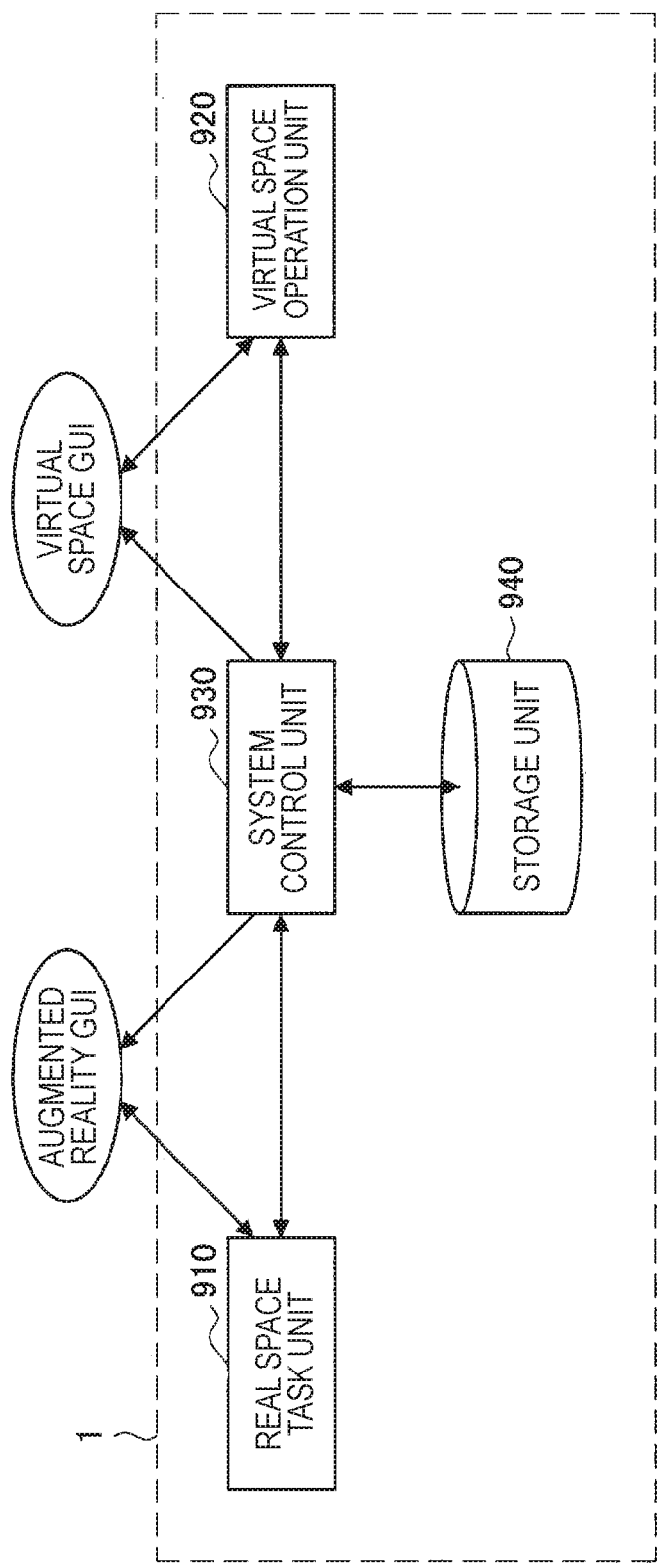
FIG. 2 is a conceptual diagram for describing a functional configuration of the farm management system according to the embodiment.

FIG. 2 is a conceptual diagram for describing a functional configuration of the farm management system 1 according to the embodiment. As illustrated in FIG. 2, the functions of the farm management system 1 can be realized by a real space task unit 910, a virtual space operation unit 920, a system control unit 930, and a storage unit 940.

The real space task unit 910 has a function of executing a task related to the cattle B30 in the real space of the farm. The above function of the real space task unit 910 is realized by the drone 20, the sensor 30, the operator terminal 40, and the operator B40 illustrated in FIG. 1, for example.

The virtual space operation unit 920 has a function of deciding a task, which the real space task unit 910 is caused to execute, by utilizing the virtual space corresponding to the real space of the farm. The above function of the virtual space operation unit 920 is realized by the manager terminal 50 and the manager B50 illustrated in FIG. 1, for example.

The system control unit 930 controls the real space task unit 910 and the virtual space operation unit 920. Specifically, the system control unit 930 controls execution of a task by the real space task unit 910 and display of the screen performed by the virtual space operation unit 920. The storage unit 940 stores data to be referred to for various kinds of processing performed by the system control unit 930. In addition, the data stored in the storage unit 940 can be rewritten by the system control unit 930. The above functions of the system control unit 930 and the storage unit 940 are realized by the information processing device 10 illustrated in FIG. 1, for example. Note that the functions of the system control unit 930 and the storage unit 940 may be realized by a plurality of devices. Note that details of the information processing device 10 will be described later.

The system control unit 930 may utilize an augmented reality graphical user interface (GUI) under control performed by the real space task unit 910. The augmented reality GUI is a GUI for presenting a feeling that the real world is augmented to the operator B40. Specifically, augmented reality GUI is utilized in a case in which functions of the real space task unit 910 are realized by the operator terminal 40c that is a head mounted display on the operator B40. The operator terminal 40c may display the augmented reality GUI including the command information in a manner in which the augmented reality GUI is overlaid on at least a part of the field of view of the operator B40 on the basis of an operation instruction from the information processing device 10. In this manner, the operator B40 is notified of the command information by the augmented reality GUI, and the operator B40 is caused to execute the task corresponding to the command information. Note that details of the screen that the operator terminal 40c displays will be described later.

In addition, the system control unit 930 may utilize a virtual space graphical user interface (GUI) under control performed by the virtual space operation unit 920. The virtual space GUI is a GUI that presents a virtual world with a feeling of reality to the manager B50 and receives an operation performed by the manager B50. Specifically, the manager terminal 50 may display the virtual space GUI including the condition information indicating the conditions of the cattle B30. In this manner, the manager B50 can decide the task that the real space task unit 910 is caused to execute by a more intuitive operation. Note that details of the screen displayed by the manager terminal 50 will be described later.

<2. Functional Configuration Of Information Processing Device>

Figure 3:
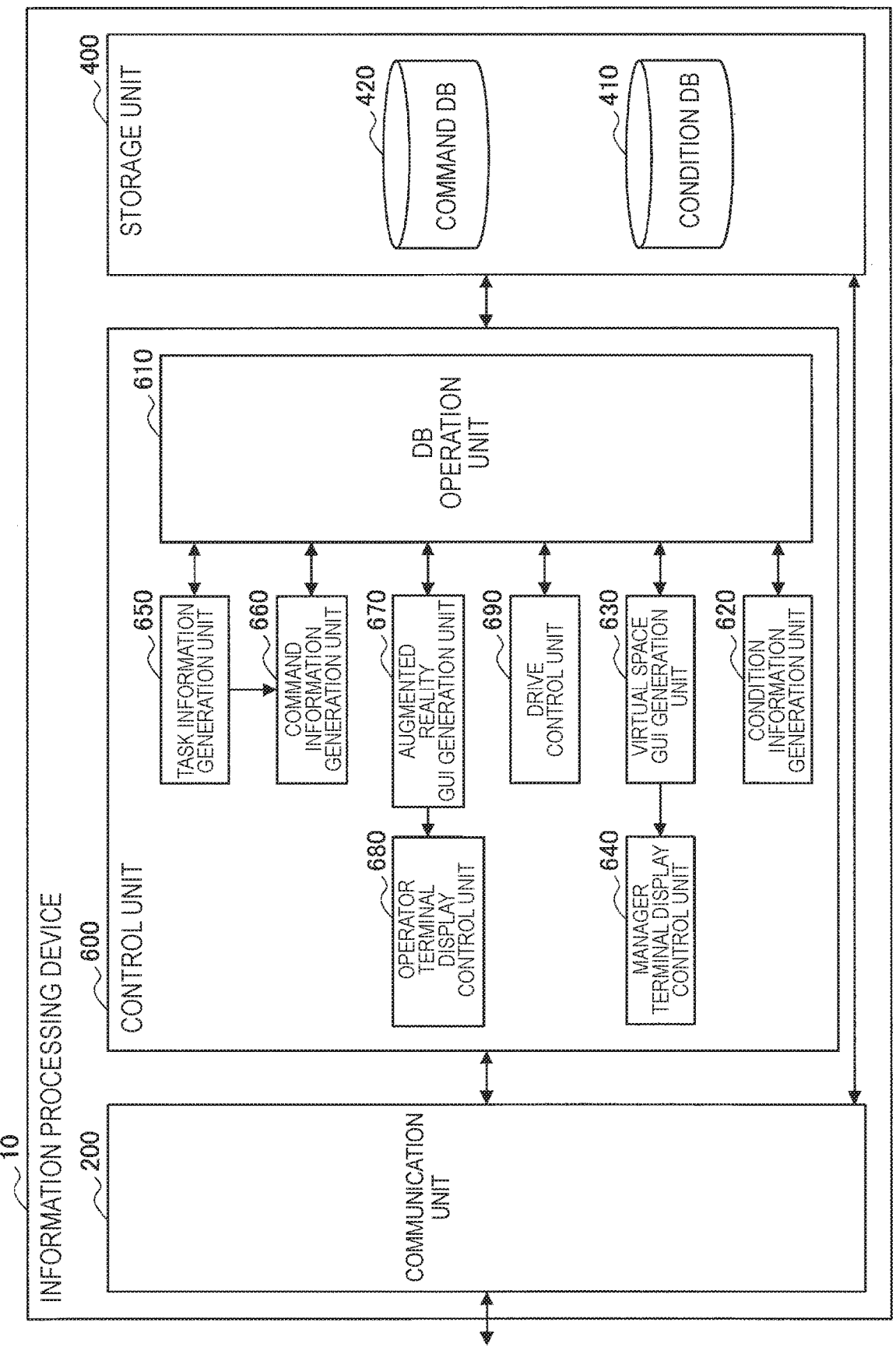
FIG. 3 is an explanatory diagram illustrating an example of a functional configuration of an information processing device according to the embodiment.

Next, a functional configuration of the information processing device 10 according to the embodiment will be described with reference to FIGS. 3 to 8. FIG. 3 is an explanatory diagram illustrating an example of the functional configuration of the information processing device 10 according to the embodiment. As illustrated in FIG. 3, the information processing device 10 includes a communication unit 200, a storage unit 400, and a control unit 600.

[2-1. Communication Unit]

The communication unit 200 communicates with a device external to the information processing device 10. Specifically, the communication unit 200 receives various kinds of information transmitted from the drone 20, the sensors 30, the operator terminals 40, and the manager terminal 50 and outputs various kinds of information to the storage unit 400 and the control unit 600. More specifically, the communication unit 200 receives a captured image or information generated by performing image processing on an image as the condition information indicating the conditions of the cattle B30 from the drone 20. In addition, the communication unit 200 receives the detection results as the condition information from the sensor 30. In addition, the communication unit 200 receives the condition information such as body condition information and the like input from the operator terminal 40 by the operator B40. In addition, the communication unit 200 receives, from the manager terminal 50, the task information indicating the task related to the cattle B30 input on the basis of the condition information. As described above, the communication unit 200 corresponds to the acquisition unit according to the present disclosure that acquires the task information indicating a task related to the cattle B30 input on the basis of the condition information.

In addition, the communication unit 200 transmits various kinds of information to external devices such as the drone 20, the sensors 30, the operator terminals 40, and the manager terminal 50 on the basis of operation instructions from the control unit 600. In this manner, operations of the external devices such as the drone 20 and the sensors 30 and display of the screen performed by the operator terminals 40 and the manager terminal 50 are controlled.

[2-2. Storage Unit]

The storage unit 400 stores data to be referred to for various kinds of processing performed by the information processing device 10. Specifically, the storage unit 400 stores image data used in control of display of images on the operator terminal 40 and the manager terminal 50 performed by the control unit 600, a prediction model used in prediction processing performed by the control unit 600, and various kinds of information input from the communication unit 200. In addition, the storage unit 400 stores a condition database (DB) 410 and a command database (DB) 420. A time at which the condition information is acquired is linked to the condition information in the condition DB 410, a. In addition, a time at which command information is output is linked to the command information in the command DB 420. Note that details of the condition DB 410 and the command DB 420 will be described later.

[2-3. Control Unit]

The control unit 600 includes a database (DB) operation unit 610, a condition information generation unit 620, a virtual space GUI generation unit 630, a manager terminal display control unit 640, a task information generation unit 650, a command information generation unit 660, an augmented reality GUI generation unit 670, an operator terminal display control unit 680, and a drive control unit 690.

(DB Operation Unit)

The DB operation unit 610 performs reading of data from the condition DB 410 and the command DB 420 that are stored in the storage unit 400 and registration of data in the condition DB 410 and the command DB 420. The DB operation unit 610 outputs the read data to the condition information generation unit 620, the virtual space GUI generation unit 630, the task information generation unit 650, the command information generation unit 660, the augmented reality GUI generation unit 670, and the drive control unit 690. In addition, the DB operation unit 610 updates the condition DB 410 and the command DB 420 by registering the acquired condition information and the command information in the condition DB 410 and the command DB 420, respectively. In this manner, it is possible to accumulate a history of the conditions of the cattle B30 and a history of the tasks provided in the commands in relation to the cattle B30 as records. Therefore, since it is possible to examine a relevance between the conditions of the cattle B30 and the tasks provided in the commands in relation to the cattle B30, it is possible to perform improvement activities such as an improvement in efficiency of business services in the farm.

(Condition Information Generation Unit)

The condition information generation unit 620 generates second condition information that is condition information indicating conditions that are different from the conditions corresponding to first condition information on the basis of the first condition included in the condition information. Here, the condition information such as the detection results transmitted from the drone 20, the sensors 30, or the operator terminals 40 is acquired by the communication unit 200, is then input to the storage unit 400, and is registered in the condition DB 410. The condition information generation unit 620 generates the second condition information on the basis of the condition information registered in the condition DB 410 corresponding to the first condition information, for example. Then, the condition information generation unit 620 may cause the DB operation unit 610 to register the second condition information in the condition DB 410 by outputting the generated second condition information to the DB operation unit 610. As described above, the information processing device 10 can acquire the condition information by the condition information generation unit 620 generating the second condition information.

Note that the generation of the second condition information by the condition information generation unit 620 may be triggered by the registration of the first condition information input from the communication unit 200 to the storage unit 400 in the condition DB 410. In addition, the generation of the second condition information by the condition information generation unit 620 may be triggered by elapse of a predetermined period of time.

The condition information generation unit 620 may generate information indicating whether or not the cattle B30 are in a mating season, as the second condition information on the basis of the information related to voice making of the cattle B30 corresponding to the first condition information, for example. In addition, the condition information generation unit 620 may generate information indicating whether or not there is a possibility that the cattle B30 are suffering from diseases, as the second condition information on the basis of information related to chewing and information indicating body temperatures of the cattle B30 corresponding to the first condition information. As described above, it is possible to acquire the condition information about further various conditions of the cattle B30 by generating the second condition information on the basis of the acquired first condition information. In this manner, it is possible to present the condition information about the further various conditions of the cattle B30 to the manager B50.

The condition information generation unit 620 may generate the second condition information by predicting the second condition information from the first condition information by using a prediction model leaned in advance, for example. In the previous learning processing, multiple pairs of second condition information and the first condition information corresponding to the second condition information are prepared. The second condition information and the first condition information prepared here correspond to teacher information and student information, respectively, in learning with a teacher. Then, the prediction model for predicting the second condition information from the first condition information is constructed in accordance with existing algorithms such as boosting or a support vector machine, for example. The prediction model is stored in the storage unit 400. The condition information generation unit 620 may specify the second condition information on the basis of the first condition information by performing the prediction using the prediction model.

Here, the aforementioned condition DB 410 will be described in more detail. The condition DB 410 may be in a data table format, for example. FIG. 4 is an explanatory diagram illustrating an example of a data table D10 in the condition DB 410. Various kinds of data can be registered in the data table D10 by the DB operation unit 610.

As illustrated in FIG. 4, a time at which the condition information has been acquired, the condition information, and other various kinds of information are linked to each other in each row in the data table D10. "START TIME" and "END TIME" in the data table D10 represent a time at which the acquisition of the condition information has been started and a time at which the acquisition has ended, respectively. Here, the acquisition of the condition information means acquisition of the condition information by the drone 20, the sensors 30, or the operator terminals 40 or acquisition of the condition information through the generation of the second condition information performed by the condition information generation unit 620. In addition, "ACQUISITION LOCATION" means a location where the condition information has been acquired, in relation to the condition information such as the detection results acquired by the drone 20, the sensors 30, or the operator terminals 40. In addition, "CATTLE ID" indicates an ID of each of the cattle B30 corresponding to the condition information. Also, "ACQUISITION MEANS" indicates a means that has been utilized for acquiring the condition information. In addition, "MEANS DETAILS" indicates more detailed information about the acquisition means. In addition, "CONDITION DETAILS" indicates more detailed information about the condition information.

As illustrated in FIG. 4, for example, condition information indicating a condition of "a slightly high body temperature" is indicated for one of the cattle B30 with a cattle ID "0263" in the row corresponding to the region G10 in the data table D10. In addition, the condition information having been acquired by a drone A corresponding to the drone 20 in FIG. 1 using an infrared camera is indicated. Also, a temperature file that is information related to the detected temperature is indicated as more detailed information of the condition information. In addition, the condition information having been acquired by the drone A between 16:29 on Dec. 14, 2015 to 17:52 on Dec. 14, 2015 is indicated. Also, an address number corresponding to the location at which the condition information has been acquired being "35.631166, 139.743612" is indicated.

Note that the generation of the second condition information may be performed by a specialist such as a veterinary. For example, the veterinary or the like can be referred to the first condition information registered in the condition DB 410 by utilizing a terminal capable of communicating with the information processing device 10 and can input the second condition information to the terminal. Then, the input second condition information can be transmitted from the terminal to the information processing device 10 and can be acquired by the information processing device 10. The second condition information input by the specialist such as the veterinary may be information indicating that there is a possibility of a disease, for example. Note that in a case in which it is determined to be necessary to generate the second condition information by the specialist such as the veterinary, a notification of the information indicating that it is necessary to request the veterinary or the like to generate the second condition information may be provided to the operator of the information processing device 10.

(Virtual Space GUI Generation Unit)

The virtual space GUI generation unit 630 generates a virtual space GUI as information that the manager terminal 50 is caused to display and outputs the virtual space GUI to the manager terminal display control unit 640. The generated virtual space GUI is displayed on the manager terminal 50 by the manager terminal display control unit 640 controlling display of the screen on the manager terminal 50. In this manner, it is possible to present a virtual world with a sense of reality to the manager B50.

The virtual space GUI generation unit 630 generates a virtual space GUI on the basis of the information stored in the storage unit 400. Specifically, the virtual space GUI generation unit 630 generates a virtual space GUI including the condition information indicating the conditions of the cattle B30 on the basis of the condition DB 410. In addition, the virtual space GUI generation unit 630 may generate the virtual space GUI in such a manner in which the positions of the cattle B30 in the real space are associated with the positions of the cattle B30 in the virtual space GUI, on the basis of the position information indicating the positions of the cattle B30. In addition, the virtual space GUI generation unit 630 may generate the virtual space GUI corresponding to a time selected by the manager B50 and output the virtual space GUI to the manager terminal display control unit 640.

The virtual space GUI generation unit 630 may generate the virtual space GUI by being triggered by an operation instruction from the manager terminal display control unit 640. In addition, the virtual space GUI generation unit 630 may generate the virtual space GUI by being triggered by the condition DB 410 being updated by the DB operation unit 610. In addition, the virtual space GUI generation unit 630 may generate the virtual space GUI by being triggered by elapse of a predetermined period of time. Note that details of the virtual space GUI generated by the virtual space GUI generation unit 630 and displayed on the manager terminal 50 will be described later.

(Manager Terminal Display Control Unit)

The manager terminal display control unit 640 controls display of the screen on the manager terminal 50. Specifically, the manager terminal display control unit 640 controls the display of the screen on the manager terminal 50 by causing the communication unit 200 to transmit the information for causing various screens to be displayed on the manager terminal 50 to the manager terminal 50. The manager terminal display control unit 640 causes the virtual space GUI generated by the virtual space GUI generation unit 630, for example, to be displayed on the manager terminal 50. In addition, the manager terminal display control unit 640 may control the display of the screen on the manager terminal 50 in response to an operation input from the manager B50.

The manager terminal display control unit 640 according to the embodiment causes the condition information indicating the conditions of the cattle B30 to be displayed on the manager terminal 50. Specifically, the manager terminal display control unit 640 causes the virtual space GUI generated by the virtual space GUI generation unit 630 to be displayed on the manager terminal 50. Here, the virtual space GUI displayed on the manager terminal 50 includes the condition information indicating the conditions of the cattle B30. As described above, the manager terminal display control unit 640 corresponds to the display control unit that controls the display of the condition information indicating the conditions of the livestock.

In addition, the manager terminal display control unit 640 may cause the virtual space to be displayed on the manager terminal 50 in such a manner in which the positions of the cattle B30 in the real space are associated with the positions of the cattle B30 in the virtual space. Specifically, the manager terminal display control unit 640 may cause the virtual space GUI generated by the virtual space GUI generation unit 630 in such a manner in which the positions of the cattle B30 in the real space are associated with the positions of the cattle B30 in the virtual space GUI to be displayed on the manager terminal 50. In this manner, the manager B50 can decide a task provided in a command to the device such as the drone 20 or the operator B40 through a more intuitive operation. In addition, the manager B50 can decide a more appropriate task on the basis of the position information of the cattle B30. Hereinafter, an example of the screen displayed on the manager terminal 50 will be described.

FIG. 5 is an explanatory diagram illustrating an example of an overview observing point screen E12 displayed on the manager terminal 50. The overview observing point screen E12 is a virtual space GUI indicating the virtual space of the farm viewed from the above. In this manner, the manager terminal display control unit 640 may cause the virtual space viewed from the above to be displayed on the manager terminal 50. In the overview observing point screen E12, the condition information and the position information of the cattle B30 in the farm are mainly displayed.

As illustrated in FIG. 5, a cattle image F17 indicating the positions of the cattle B30 is displayed in a manner in which the cattle image F17 is overlaid on a farm image F20 indicating an appearance of the farm, in the overview observing point screen E12. The farm image F20 may include an image indicating an object, such as a building, grass or a tree, or a road, for example, fixed to a land in the farm. In addition, an image indicating the positions of the drone 20 and the operator B40 may be displayed in the overview observing point screen E12. Note that information indicating whether or not it is possible to execute a task related to the cattle B30 may be displayed as information indicating running statuses of the drone 20 and the operator B40 in the overview observing point screen E12.

In addition, the condition information indicating the conditions of the cattle B30 is displayed in the overview observing point screen E12. For example, a cattle condition icon F18 indicating the conditions of each of the cattle B30 is displayed in the vicinity of the cattle image F17 of the corresponding one of the cattle B30 in the overview observing point screen E12 as illustrated in FIG. 5. For example, the manager terminal display control unit 640 may present the respective conditions of the cattle B30 to the manager B50 by differentiating types of the cattle condition icons F18 displayed in the overview observing point screen E12 depending on the conditions of the cattle B30.

Specifically, the manager terminal display control unit 640 may differentiate colors of the displayed cattle condition icons F18 depending on the conditions of the cattle B30. In addition, the manager terminal display control unit 640 may differentiate the shapes of the displayed cattle condition icons F18 depending on the conditions of the cattle B30. In the overview observing point screen E12, a condition icon type area F16 indicating correlations between the types of the cattle condition icons F18 and the conditions of the cattle B30 may be provided on the right side at the center as illustrated in FIG. 5, for example. Note that the differences in darkness of the hatching in the cattle condition icons F18 indicate differences in the conditions of the cattle B30 in FIG. 5.

In addition, a latest condition acquisition button F14 for causing the latest conditions of the cattle B30 to be displayed on the manager terminal 50 may be displayed at the upper right portion in the overview observing point screen E12 as illustrated in FIG. 5, for example. In a case in which the latest condition acquisition button F14 is selected by the manager B50, for example, the manager terminal display control unit 640 causes the virtual space GUI generated immediately before by the virtual space GUI generation unit 630 to be displayed on the manager terminal 50. In this manner, it is possible to present the condition information indicating the latest conditions of the cattle B30 to the manager B50. In addition, it is possible to present the position information indicating the latest positions of the cattle B30 to the manager B50.

In addition, a time slider F12 that is a slider for selecting a time corresponding to the virtual space GUI that the manager terminal 50 is caused to display may be displayed at an upper portion in the overview observing point screen E12 as illustrated in FIG. 5, for example. In a case in which a time that is different from the time corresponding to the virtual space GUI that is being currently displayed is selected by the manager B50 using the time slider F12, for example, the manager terminal display control unit 640 causes the virtual space GUI corresponding to the time selected by the manager B50 to be displayed on the manager terminal 50. Specifically, the manager terminal display control unit 640 provides a command of generating the virtual space GUI corresponding to the selected time to the virtual space GUI generation unit 630. Then, the manager terminal display control unit 640 acquires the virtual space GUI generated by the virtual space GUI generation unit 630 and causes the virtual space GUI to be displayed on the manager terminal 50.

The manager B50 may be able to select a time in the past or in the future by using the time slider F12. In a case in which a time in the past is selected by the manager B50, the virtual space GUI generation unit 630 may generate the virtual space GUI corresponding to the selected time by utilizing the information corresponding to the selected time in the condition DB 410, for example. Meanwhile, in a case in which a time in the future is selected by the manager B50, the virtual space GUI generation unit 630 may generate the virtual space GUI corresponding to the selected time by using the prediction model leaned in advance, for example. As described above, the manager terminal display control unit 640 may cause the virtual space corresponding to each of a plurality of times to be displayed on the manager terminal 50 in such a manner in which the virtual space is switched. In this manner, the manager B50 can decide a task to be provided in a command to the device such as the drone 20 or the operator B40 on the basis of the history of the conditions of the cattle B30.

Note that in a case in which a time in the past is selected, and when information corresponding to the selected time is not exist or is insufficient in the condition DB 410, the virtual space GUI generation unit 630 may generate the virtual space GUI by utilizing information corresponding to a time that is different from the selected time in the condition DB 410. Specifically, the virtual space GUI generation unit 630 may generate the virtual space GUI by linearly interpolating information corresponding to a time immediately before and immediately after the selected time, in the information included in the condition DB 410. In addition, the virtual space GUI generation unit 630 may generate the virtual space GUI on the basis of the information corresponding to the time immediately before the selected time, in the information included in the condition DB 410.

In addition, an observing point icon F22 indicating an observing point and a field of view icon F23 indicating a field of view in a first-person observing point screen, which will be described later, may be displayed in the overview observing point screen E12 as illustrated in FIG. 5, for example. The manager terminal display control unit 640 may control display of the observing point icon F22 and the field of view icon F23 in response to an operation input from the manager B50. The manager B50 can set the observing point in the first-person observing point screen, which will be described later, by adjusting the position of the observing point icon F22 in the overview observing point screen E12. Then, the manager B50 can set the field of view by adjusting the direction of the observing point icon F22 in the overview observing point screen E12 and thus adjusting a line-of-sight direction in the first-person observing point screen, which will be described later.

Figure 6:
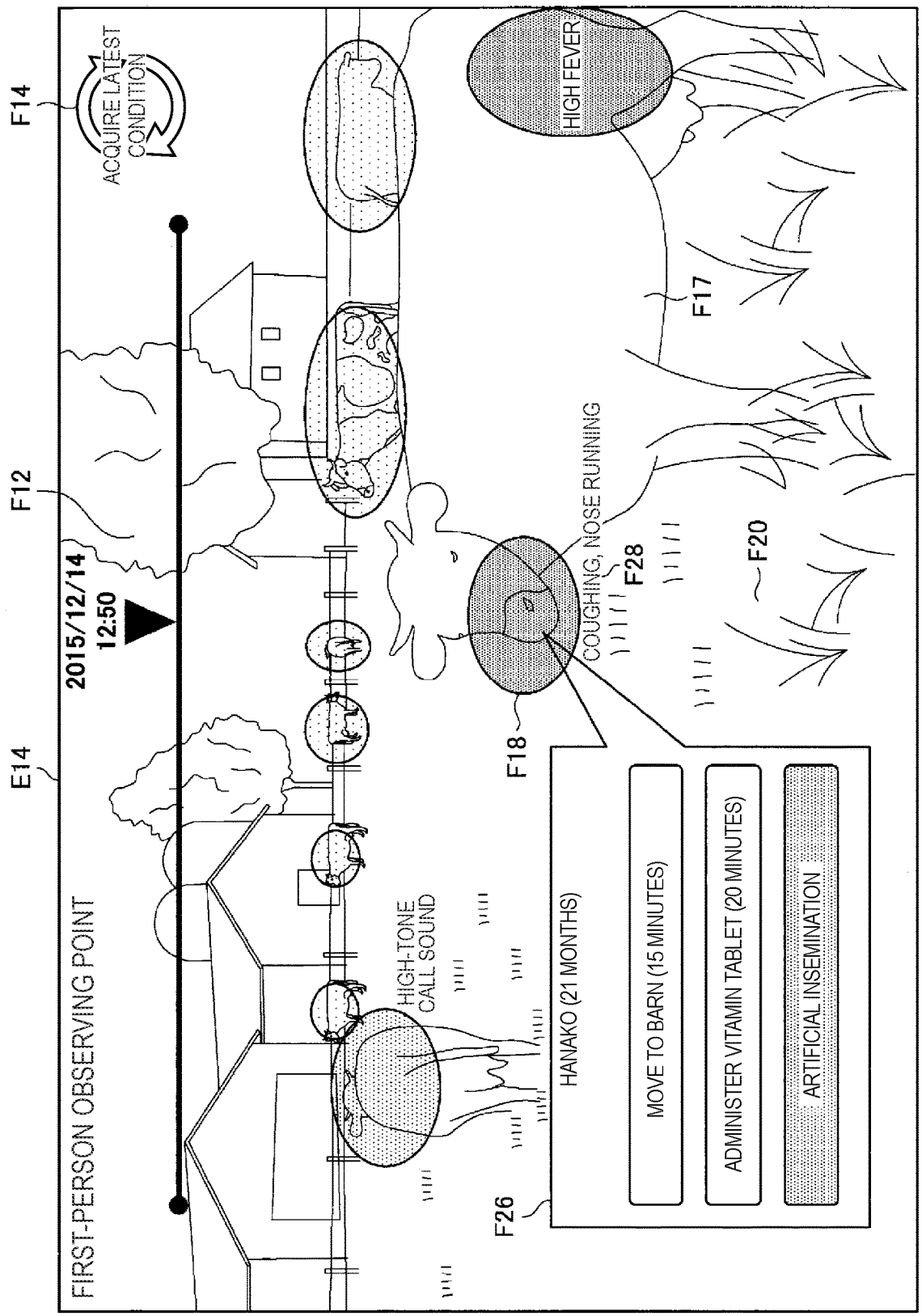
FIG. 6 is an explanatory diagram illustrating an example of a first-person observing point screen displayed on the manager terminal.

The manager terminal display control unit 640 can switch between display of the overview observing point screen E12 indicating the virtual space of the farm viewed from the above as illustrated in FIG. 5 and display of the first-person observing point screen E14 indicating the virtual space of the farm viewed from the ground as illustrated in FIG. 6 in response to an operation input from the manager B50. According to the overview observing point screen E12, it is possible to check the conditions of the cattle B30 in a wider range of the farm as compared with the first-person observing point screen E14. Meanwhile, according to the first-person observing point screen E14, it is possible to check more detailed information about the respective cattle B30 and to input the task information as compared with the overview observing point screen E12. Hereinafter, details of such a first-person observing point screen E14 will be described.

FIG. 6 is an explanatory diagram illustrating an example of the first-person observing point screen E14 displayed on the manager terminal 50. The first-person observing point screen E14 is the virtual space GUI indicating the virtual space of the farm viewed from the ground. In this manner, the manager terminal display control unit 640 may cause the virtual space viewed from the ground to be displayed on the manager terminal 50. The condition information and the position information of the cattle B30 that appear in the field of view indicated by the field of view icon F23 in the overview observing point screen E12 are mainly displayed in the first-person observing point screen E14.

As illustrated in FIG. 6, the cattle image F17 indicating the positions of the cattle B30 is displayed in such a manner in which the cattle image F17 is overlaid on the farm image F20 indicating the appearance of the farm in the first-person observing point screen E14 as illustrated in FIG. 6 in a manner similar to that in the overview observing point screen E12, for example. In addition, an image indicating the positions of the drone 20 and the operator B40 may be displayed in the first-person observing point screen E14. Since the observing point is located on the ground in the first-person observing point screen E14, it is possible to present an image that is closer to a scene that appears in the field of view of the operator B40 to the manager B50 as compared with the overview observing point screen E12.

In addition, a message F28 related to the conditions indicated by the cattle condition icon F18 may be displayed in the vicinity of the cattle condition icon F18 in the first-person observing point screen E14 as illustrated in FIG. 6. For example, the message F28 may be more detailed information of the condition indicated by the cattle condition icon F18. In addition, the message F28 may be information used for generating the condition information corresponding to the cattle condition icon F18. Specifically, in a case in which the second condition information indicating that there is a possibility that one of the cattle B30 is suffering from a disease is generated on the basis of the first condition information indicating that the body temperature of the one of the cattle B30 has a high fever, is coughing, and has a running nose by the condition information generation unit 620, the first condition information may be displayed as the message F28 as illustrated in FIG. 6.

In addition, the cattle condition icon F18 and the message F28 corresponding to the cattle condition icon F18 may be displayed in the vicinity of a portion corresponding to the message F28 in the cattle image F17 in the first-person observing point screen E14 as illustrated in FIG. 6. Specifically, the cattle condition icon F18 indicating that there is a possibility that one of the cattle B30 is suffering from a disease and the message F28 indicating that the one of the cattle B30 is coughing and has a running nose may be displayed in the vicinity of a nose in the cattle image F17 as illustrated in FIG. 6.

In addition, the first-person observing point screen E14 can correspond to an input screen for receiving an input from the manager B50 regarding the task information indicating the task provided in the command to the device such as the drone 20 or the operator terminal 40. Functions of the first-person observing point screen E14 as the input screen are realized by a task selection window F26, for example. In the first-person observing point screen E14, the task selection window F26 is provided in the vicinity of the cattle image F17 indicating the cattle B30 corresponding to the task, for example, in order for the manager B50 to input the task information indicating the task provided in the command to the device such as the drone 20 or the operator B40.

A plurality of candidates for the task related to the cattle B30 generated on the basis of the condition information may be displayed in the task selection window F26. For example, "MOVE TO BARN", "ADMINISTER VITAMIN TABLET", and "ARTIFICIAL INSEMINATION" are displayed as candidates for the task as illustrated in FIG. 6 in the task selection window F26. In addition, an estimation time required for the task may be displayed for each of the candidates for the task in the task selection window F26. Note that regions in which candidates for the task that cannot be executed due to attributes of the cattle B30, conditions of equipment in the farm, or the like are indicated may be grayed down in the task selection window F26. Task information indicating the task selected by the manager B50 from among the candidates for the task displayed in the task selection window F26 is transmitted as the task information input on the basis of the condition information from the manager terminal 50 to the information processing device 10.

The plurality of candidates for the task related to the cattle B30 may be generated on the basis of the condition information by the manager terminal display control unit 640, for example. As described above, the manager terminal display control unit 640 may cause the plurality of candidates for the task related to the cattle B30 generated on the basis of the condition information to be displayed on the manager terminal 50. In this manner, the manager B50 can more easily decide the task provided in the command to the device such as the drone 20 or the operator B40.

Note that the task selection window F26 corresponding to the selected cattle B30 may be displayed by being triggered by the manager B50 selecting one of the cattle B30 in the first-person observing point screen E14. In addition, a name and the number of months after birth of the selected one of the cattle B30 may be displayed in the task selection window F26. In addition, the task selection window F26 may have a speech balloon shape indicating the selected cattle B30 as illustrated in FIG. 6.

Although the example in which the task information is input by the manager B50 selecting the task from among the displayed candidates for the task has been described above, the manager B50 may input the task information by a method other than the selection of the task from among the candidates for the task. For example, the manager B50 may determine a task provided in the command to the device such as the drone 20 or the operator B40 and input the task information indicating the task, on the basis of the displayed condition information of the cattle B30. In such a case, the task selection window F26 may not be displayed.

Although the example in which the input of the task information form the manager B50 can be received in the first-person observing point screen E14 has been described above, the input of the task information from the manager B50 may be able to be received in the overview observing point screen E12. For example, the task selection window F26 may be displayed in the overview observing point screen E12.

In addition, the manager B50 may be able to talk to the operator B40 by utilizing the overview observing point screen E12 and the first-person observing point screen E14. In a case in which an image indicating the operator B40 is displayed in the overview observing point screen E12 or the first-person observing point screen E14, for example, and the manager B50 selects the image indicating the operator B40, the manager B50 may be able to talk to the operator B40 by the manager terminal 50 and the operator terminal 40 starting communication.

In addition, an image such as a farm image F20 displayed in the overview observing point screen E12 and the first-person observing point screen E14 may be generated by using a three-dimensional model stored in advance in the storage unit 400. In addition, the three-dimensional model may be generated or updated on the basis of an image captured by the drone 20. In addition, a part of the overview observing point screen E12 and the first-person observing point screen E14 may include the image captured by the drone 20 or the like. In addition, although the example in which the manager terminal display control unit 640 causes a screen of the outdoor space in the farm to be displayed on the manager terminal 50 has been described above, the manager terminal display control unit 640 may cause the screen regarding the indoor space in the farm to be displayed on the manager terminal 50. Note that the manager terminal display control unit 640 may control the display of the screen on the manager terminal 50 for one of or both the indoor space and the outdoor space in the farm.

In addition, the manager terminal display control unit 640 may display the virtual space GUI on the manager terminal 50 by being triggered by an operation input from the manager B50. In that case, the manager terminal display control unit 640 may provide a command of generating the virtual space GUI to the virtual space GUI generation unit 630 in response to an operation input from the manager B50. In addition, the manager terminal display control unit 640 may update the virtual space GUI that is caused to be displayed on the manager terminal 50 by being triggered by the virtual space GUI generation unit 630 generating the virtual space GUI. In addition, the manager terminal display control unit 640 may update the virtual space GUI that is caused to be displayed on the manager terminal 50 by being triggered by elapse of a predetermined period of time.

(Task Information Generation Unit)

The task information generation unit 650 generates the task information and outputs the task information to the command information generation unit 660 on the basis of the condition information. The task information generation unit 650 may acquire the condition information included in the condition DB 410 via the DB operation unit 610, for example.

The farm management system 1 according to the embodiment may be configured such that it is possible to switch between a manual mode in which the task information is input by the manager B50 using the manager terminal 50 and an automatic mode in which the task information is input by the information processing device 10 rather than the operation performed by the manager B50. The manual mode and the automatic mode may be switched in response to an operation input from the manager B50 to the manager terminal 50, for example. Information indicating that the mode has been switched is transmitted from the manager terminal 50 to the information processing device 10. Specifically, the generation of the task information by the task information generation unit 650 is performed in a case in which the task information has been input in the automatic mode.

In a case of the manual mode, the input of the task information from the manager B50 is received in the first-person observing point screen E14, and the task information is transmitted from the manager terminal 50 to the information processing device 10 as described above. In this case, the information processing device 10 outputs command information for providing a command for the task indicated by the task information transmitted from the manager terminal 50. Meanwhile, in the case of the automatic mode, the task information generation unit 650 in the information processing device 10 generates the task information on the basis of the condition information. In this case, the information processing device 10 outputs command information for providing a command for the task indicated by the task information generated by the task information generation unit 650. Note that details of the processing related to the output of the command information will be described later.

It is possible to omit a burden of manpower from the manager B50 for the task information can be omitted by the task information being generated by the task information generation unit 650 on the basis of the condition information. In this manner, it is possible to reduce a personnel burden in the management of the cattle B30.

The task information generation unit 650 may generate the task information by predicting the task information from the condition information using the prediction model learned in advance, for example. In the previous learning processing, multiple pairs of the task information input by the manager B50 and the condition information corresponding to the task information are prepared. The task information and the condition information prepared here correspond to teacher information and student information in learning with a teacher. Then, the prediction model for predicting the task from the condition information is constructed in accordance with existing algorithms such as boosting or a support vector machine, for example. The prediction model is stored in the storage unit 400. The task information generation unit 650 may specify the task information on the basis of the condition information by performing prediction using the prediction model.

Note that the generation of the task information by the task information generation unit 650 may be triggered by the DB operation unit 610 updating the condition DB 410. In addition, the generation of the task information by the task information generation unit 650 may be triggered by elapse of a predetermined period of time.

(Command Information Generation Unit)

The command information generation unit 660 generates command information for providing a command for the task to the external device such as the drone 20 and the operator B40. For example, the command information generation unit 660 generates the command information for providing the command for the task indicated by the task information on the basis of the task information indicating the task related to the cattle B30. The command information generation unit 660 may generate the command information for providing a command for the task indicated by the task information by being triggered by the information processing device 10 receiving the task information input from the manager B50. Note that in a case in which the task information is generated by the task information generation unit 650, the command information generation unit 660 may generate the command information for providing the command for the task indicated by the task information by being triggered by the task information being generated.

In addition, the command information generation unit 660 may cause the DB operation unit 610 to register the command information in the command DB 420 by outputting the generated command information to the DB operation unit 610. The command information generation unit 660 may cause the DB operation unit 610 to register information indicating a command target in the command DB 420 by deciding the command target that is a target of the command for the task and outputting the information indicating the decided command target to the DB operation unit 610. In this manner, the command information and the information indicating the command target are linked to each other.

The command information generation unit 660 may decide the command target that is a target of the command for the task on the basis of the distance between each of the operator B40 and the external device and the cattle B30 corresponding to the task information, for example. Specifically, in a case in which "MOVE TO BARN" is selected as the task related to the cattle B30 by the manager B50 in the task selection window F26 illustrated in FIG. 6, the command information generation unit 660 may decide the operator B40 located at the closest position to the one of the cattle B30 as a target of the command. In that case, the command information for providing the command for the task to move the one of the cattle B30 to the barn and the information indicating that the command target is the operator B40 are linked to each other.

In addition, the command information generation unit 660 may decide the command target on the basis of the operator B40 and a running status of each external device. Specifically, in a case in which "MOVE TO BARN" is selected as a task related to the one of the cattle B30 by the manager B50 and when there is no operator B40 who can execute the task within a range of equal to or less than a predetermined distance from the cattle B30, the drone 20 may be decided as a command target. In that case, the command information for providing the command for the task of moving the cattle B30 to the barn and the information indicating that the command target is the drone 20 are linked to each other.

Here, the aforementioned command DB 420 will be described in more detail. The command DB 420 may be in the data table format, for example. FIG. 7 is an explanatory diagram illustrating an example of the data table D20 in the command DB 420. Various kinds of data can be registered in the data table D20 by the DB operation unit 610.

As illustrated in FIG. 7, a time at which the command information has been output, the command information, and other various kinds of information are linked in each row in the data table D20. In the data table D20, "COMMAND START TIME" and "TASK COMPLETION TIME" represent a time at which the output of the command information has been started and a time at which the task corresponding to the command information has been completed, respectively. Note that the information processing device 10 may end the output of the command information in a case in which the information indicating the task corresponding to the command information has been completed is received. In this case, "TASK COMPLETION TIME" represents a time at which the output of the command information has ended. In addition, "STATUS" represents a progress condition of the task provided in the command. In addition, "COMMAND SUBJECT" represents a subject who has input the task information indicating the task provided in the command. Note that in a case in which the command information is generated by the command information generation unit 660, the command information generation unit 660 corresponds to the command subject. In addition, "COMMAND TARGET" represents a target of the command for the task. Here, the command information includes "TASK TARGET", "TASK TYPE", and "TASK DETAILS", for example. "TASK TARGET" represents the one of the cattle B30 corresponding to the task provided in the command. In addition, "TASK TYPE" represents the type of the task provided in the command. In addition, "TASK DETAILS" represents detailed information of the task provided in the command.

As illustrated in FIG. 7, for example, the command information for providing a command for a task of moving the one of the cattle B30 with the cattle ID "0134" to the barn is displayed in the row corresponding to the region G20 in the data table D20. In addition, the fact that the command target that is the target of the command for the task is a farm worker A corresponding to the operator B40 in FIG. 1 is illustrated. Therefore, an output destination of the command information is the operator terminal 40 used by the farm worker A. In addition, the fact that the subject of the command is a farm manager A corresponding to the manager B50 in FIG. 1 is illustrated. In addition, the facts that the output of the command information has been started at 15:35 on Dec. 14, 2015, and that the task corresponding to the command information has not been completed and is in an unfinished state are illustrated.

Note that the command information generation unit 660 may generate the command information regardless of the fact that the information processing device 10 has received the task information input by the manager B50 and the fact that the task information has been generated by the task information generation unit 650. For example, the command information generation unit 660 may generate command information for causing a command to be provided for a preset task by being triggered by elapse of a predetermined period of time. Specifically, the command information generation unit 660 may generate command information for providing a command of detecting the physical amount every ten minutes to the sensor 30. In addition, the command information generation unit 660 may generate command information for providing a command of imaging a predetermined location every hour to the drone 20. In addition, the command information generation unit 660 may generate command information for providing commands for tasks executed cooperatively by the external device such as the drone 20 and the operator B40 to the external device and the operator B40.

(Augmented Reality GUI Generation Unit)

The augmented reality GUI generation unit 670 generates an augmented reality GUI as information that is caused to be displayed on the operator terminal 40 and outputs the augmented reality GUI to the operator terminal display control unit 680. The generated augmented reality GUI is displayed on the operator terminal 40c by the operator terminal display control unit 680 controlling the display of the screen on the operator terminal 40c that is a head mounted display. In this manner, it is possible to present a feeling that the real world has been augmented to the operator B40.

The augmented reality GUI generation unit 670 generates the augmented reality GUI on the basis of the information stored in the storage unit 400. Specifically, the augmented reality GUI generation unit 670 generates the augmented reality GUI including the command information for providing the command for the task on the basis of the command DB 420. In addition, the augmented reality GUI generation unit 670 generates the augmented reality GUI in a case in which the output destination of the command information is the operator terminal 40c that is a head mounted display. The augmented reality GUI generation unit 670 generates the augmented reality GUI by being triggered by the command DB 420 being updated by the DB operation unit 610, for example. In addition, details of the augmented reality GUI generated by the augmented reality GUI generation unit 670 and displayed on the operator terminal 40c will be described later.

(Operator Terminal Display Control Unit)

The operator terminal display control unit 680 controls the display of the screen on the operator terminal 40. Specifically, the operator terminal display control unit 680 controls the display of the screen on the operator terminal 40 by causing the communication unit 200 to transmit the information for causing various screens to be displayed on the operator terminal 40 to the operator terminal 40. In addition, the operator terminal display control unit 680 may control the display of the screen on the operator terminal 40 in response to an operation input from the operator B40.

The operator terminal display control unit 680 notifies the operator B40 of the command information by outputting the command information to the operator terminal 40 that the operator B40 uses. The command information is displayed on the operator terminal 40 that has received the command information. In this manner, the notification of the command information to the operator B40 is realized. Therefore, the operator B40 can execute the task determined on the basis of the condition information without determining the task to be executed as needed in accordance with the actual conditions of the cattle B30. Accordingly, it is possible to appropriately manage the cattle B30 while reducing the personal burden in checking the actual conditions of the cattle B30 and checking conditions in the entire farm by the operator B40. Therefore, it is possible to further improve the efficiency of the management of the cattle B30.

As described above, the operator terminal display control unit 680 corresponds to the output unit according to the present disclosure that outputs the command information. The operator terminal display control unit 680 outputs the command information by being triggered by the DB operation unit 610 updating the command DB 420, for example. Note that the notification of the command information to the operator B40 is not limited to an example in which the notification is realized by the display of the command information and may be realized by a voice output of the command information, for example. Specifically, the control unit 600 may include a voice output control unit that controls a voice output from the operator terminal 40. In that case, the voice output control unit can correspond to the output unit that notifies the operator B40 of the command information by outputting the command information to the operator terminal 40.

In addition, the operator terminal display control unit 680 may cause the augmented reality GUI generated by the augmented reality GUI generation unit 670 to be displayed on the operator terminal 40c that is a head mounted display. In this manner, the augmented reality GUI including the command information is displayed in such a manner in which the augmented reality GUI is overlaid on at least a part of the field of view of the operator B40. Hereinafter, an example of the screen displayed by the operator terminal 40c will be described.

FIG. 8 is an explanatory diagram illustrating an example of an overlaid screen E20 displayed on the operator terminal 40. The overlaid screen E20 is the augmented reality GUI displayed in such a manner in which the augmented reality GUI is overlaid on at least a part of the field of view of the operator B40 when the farm is viewed from the ground. In the overlaid screen E20, the command information corresponding to the cattle B30 in the real space that appears in the field of view of the operator B40 is mainly displayed.

In FIG. 8, the cattle B30, a farm B32, and a mountain B34 that is an example of a background of the farm B32 in the real space that appears in the field of view of the operator B40 are illustrated. Here, an example in which command information for providing a command for a task of moving the cattle B30 to the barn is displayed in the overlaid screen E20 is illustrated in FIG. 8. For example, a message F30, an object F32, and an arrow F34 are illustrated as the command information as illustrated in FIG. 8 in the overlaid screen E20. The message F30 indicates details of the task corresponding to the command information. In addition, the message F30 may have a speech balloon shape indicating the one of the cattle B30 corresponding to the command information. The object F32 is displayed in the vicinity of the cattle B30 in order to indicate the one of the cattle B30 corresponding to the command information. The arrow F34 indicates the direction of the barn corresponding to the one of the cattle B30. In other words, the arrow F34 indicates a direction in which the cattle B30 are made to move in accordance with the task corresponding to the command information.

The operator B40 can check the command information in the condition in which the cattle B30 in the real space corresponding to the task provided in the command appear in the field of view by the augmented reality GUI including the command information being displayed in such a manner in which the augmented reality GUI is overlaid on at least a part of the field of view of the operator B40. In this manner, the operator B40 can more smoothly execute the task related to the cattle B30.

Although the example in which the operator terminal display control unit 680 controls the display of the screen on the operator terminal 40c that is a head mounted display by utilizing the augmented reality GUI has mainly been described above, the operator terminal display control unit 680 may control the display of the screen on the operator terminal 40 of another type. For example, the operator terminal display control unit 680 may control the display of the screen on an operator terminal 40a that is a personal computer or an operator terminal 40b that is a smartphone. In that case, the operator terminal display control unit 680 may acquire the command information from the command DB 420 via the DB operation unit 610, for example, and output the command information to the operator terminal 40.

Note that in a case in which the task corresponding to the command information output by the operator terminal display control unit 680 has been completed, the operator B40 inputs information indicating that the task has been completed to the operator terminal 40. In this manner, the information is transmitted from the operator terminal 40 to the information processing device 10. The operator terminal display control unit 680 ends the output of the command information by being triggered by the reception of the information by the information processing device 10. In addition, the DB operation unit 610 registers the information indicating that the task corresponding to the command information has been completed in the command DB 420.

(Drive Control Unit)

The drive control unit 690 controls operations of the external device such as the drone 20 or the sensors 30. Specifically, the drive control unit 690 controls the operations of the external device by causing the communication unit 200 to transmit an operation instruction for controlling the operations of the external device to the external device. In addition, the drive control unit 690 corresponds to the output unit that controls the execution of the task by the external device by outputting the command information to the external device. The drive control unit 690 outputs the command information by being triggered by the command DB 420 being updated by the DB operation unit 610, for example.

The external device, the execution of task by which is controlled by the drive control unit 690, may include the drone 20. In other words, the drive control unit 690 may control the execution of the task by the drone 20 by outputting the command information to the drone 20. In this manner, the execution of the task determined on the basis of the condition information is realized by the drone 20. For example, the drone 20 can executes tasks such as guidance of the cattle B30, detection of the physical amounts by the sensors 30 mounted on the drone 20, and image capturing by the imaging device mounted on the drone 20, on the basis of the command information. Therefore, it is possible to appropriately manage the cattle B30 while reducing the personnel burden for the tasks related to the cattle B30 as well as the checking of the actual conditions of the cattle B30 and checking of the conditions in the entire farm by the operator B40. Therefore, it is possible to further improve the efficiency of the management of the cattle B30.

In addition, the external device, the execution of task by which is controlled by the drive control unit 690, may include each sensor 30. In other words, the drive control unit 690 corresponds to the output unit that controls the execution of the task by the sensor 30 by outputting the command information to the sensor 30. In this manner, the execution of the task determined on the basis of the condition information is realized by the sensor 30. For example, the sensor 30 can execute a task of detecting physical amounts on the basis of the command information. In addition, the sensor 30 may further perform arithmetic processing on the detected physical amounts on the basis of the command information. Therefore, it is possible to appropriately manage the cattle B30 while reducing the personnel burden for the tasks related to the cattle B30 as well as the checking of the actual conditions of the cattle B30 and the checking of the conditions in the entire farm by the operator B40. Therefore, it is possible to further improve the efficiency of the management of the cattle B30.

Note that the external device, the execution of the task by which is controlled by the drive control unit 690, may include a device other than the drone 20 and the sensors 30. For example, a mobile object such as an automatic traveling vehicle may be applied as the external device. In this case, the drive control unit 690 can control the execution of tasks by the automatic traveling vehicle or the like by outputting the command information to the automatic traveling vehicle or the like.

In addition, in a case in which the task corresponding to the command information output by the drive control unit 690 has been completed, the external device such as the drone 20 or the sensors 30 transmits information indicating that the task has been completed to the information processing device 10. The drive control unit 690 ends the output of the command information by being triggered by the reception of the information by the information processing device 10. In addition, the DB operation unit 610 registers the information indicating that the task corresponding to the command information has been completed in the command DB 420.

<3. Operations>

Next, a flow of various kinds of processing performed by the farm management system 1 according to the embodiment will be described.

[3-1. Processing of Acquiring Command Information]

First, a flow of processing of acquiring command information performed by the information processing device 10 according to the embodiment will be described with reference to FIG. 9. FIG. 9 is a flowchart illustrating an example of a flow of processing of acquiring the command information performed by the information processing device 10 according to the embodiment. Note that FIG. 9 illustrates processing performed after acquisition of the condition information and registration of the condition information in the condition DB 410 are performed.

In the processing of acquiring the command information, the information processing device 10 determines whether or not the task information has been input in the automatic mode first as illustrated in FIG. 9 (Step S502). In a case in which it is determined that the task information has been input in the automatic mode (Step S502/YES), the processing proceeds to Step S508. Meanwhile, in a case in which it is determined that the task information has not been input in the automatic mode (Step S502/NO), the virtual space GUI generation unit 630 generates a virtual space GUI including condition information indicating the conditions of the cattle B30 on the basis of the condition DB 410 (Step S504) and outputs the virtual space GUI to the manager terminal display control unit 640. Next, the manager terminal display control unit 640 causes the virtual space GUI generated by the virtual space GUI generation unit 630 to be displayed on the manager terminal 50 (Step S506).

Then, the task information is input to the manager terminal 50 by the manager B50 on the basis of the condition information and is transmitted from the manager terminal 50 to the information processing device 10. The communication unit 200 acquires the task information (Step S508). Note that in the case in which it is determined that the task information has been input in the automatic mode (Step S502/YES), the task information is acquired by the information processing device 10 by being generated by the task information generation unit 650 on the basis of the condition information (Step S508). Next, the command information generation unit 660 generates command information for providing a command for the task indicated by the task information on the basis of the task information indicating the task related to the cattle B30 (Step S510). Then, the DB operation unit 610 registers the command information input from the command information generation unit 660 in the command DB 420 (Step S512), and the processing illustrated in FIG. 9 ends.

[3-2. Processing of Outputting Command Information]

Figure 10:
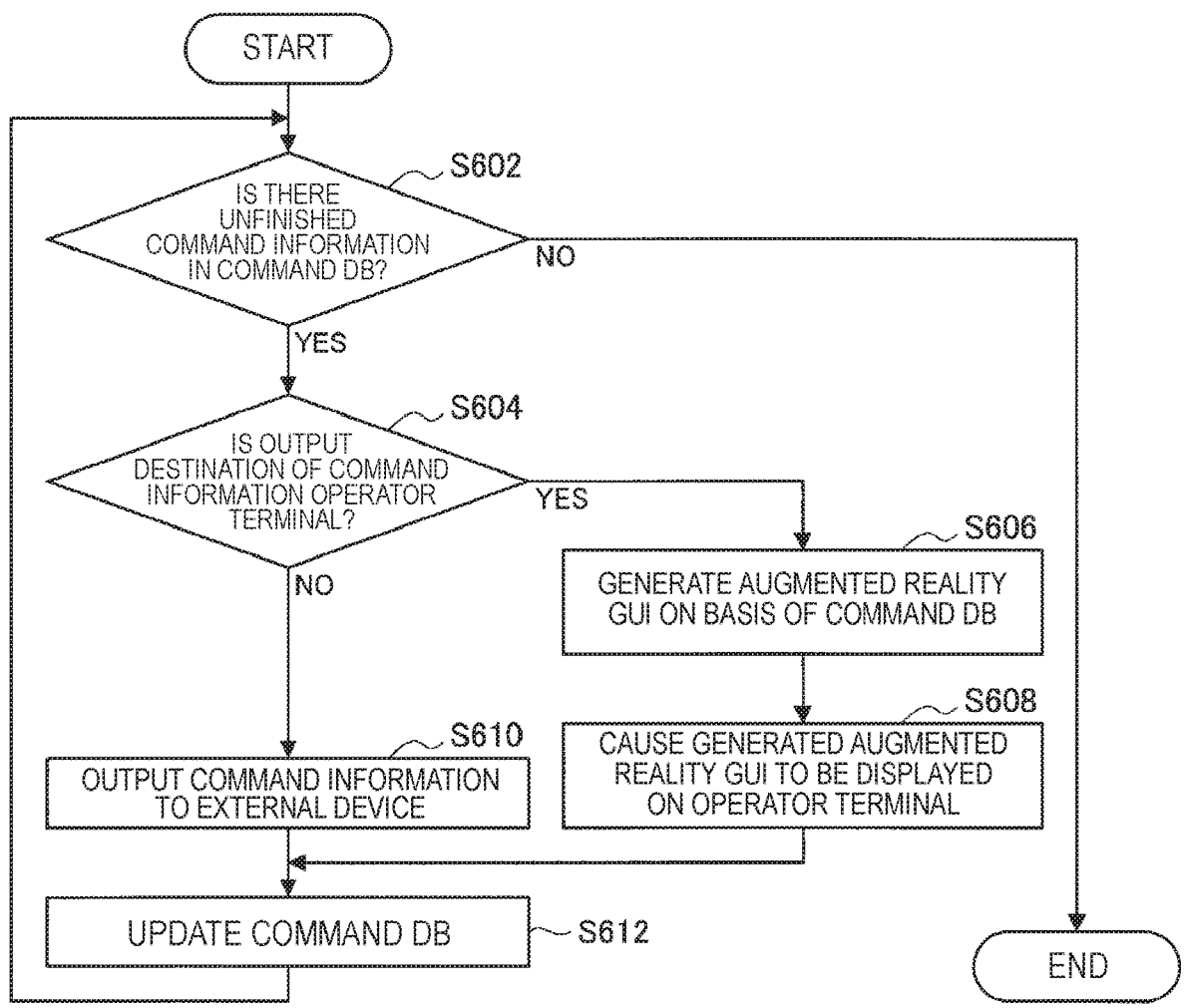
FIG. 10 is a flowchart illustrating an example of a flow of processing of outputting the command information, which is performed by the information processing device according to the embodiment.

Next, a flow of processing of outputting the command information performed by the information processing device 10 according to the embodiment will be described with reference to FIG. 10. FIG. 10 is a flowchart illustrating an example of a flow of the processing of outputting the command information performed by the information processing device 10 according to the embodiment. Note that FIG. 10 illustrates a flow of the processing performed after the registration of the command information in the command DB 420 by the DB operation unit 610.

In the processing of outputting the command information, the information processing device 10 determines whether or not there is unfinished command information in the command DB 420 first as illustrated in FIG. 10 (Step S602). In a case in which it is determined that there is no unfinished command information in the command DB 420 (Step S602/NO), the processing illustrated in FIG. 10 ends. Meanwhile, in a case in which it is determined that there is unfinished command information in the command DB 420 (Step S602/YES), the information processing device 10 determines whether or not an output destination of the command information is the operator terminal 40 (Step S604).

In a case in which it is determined that the output destination of the command information is the operator terminal 40 (Step S604/YES), the augmented reality GUI generation unit 670 generates an augmented reality GUI including command information for providing a command for the task on the basis of the command DB 420 (Step S606) and outputs the augmented reality GUI to the operator terminal display control unit 680. Then, the operator terminal display control unit 680 causes the augmented reality GUI generated by the augmented reality GUI generation unit 670 to be displayed on the operator terminal 40c that is a head mounted display (Step S608). In this manner, the notification of the command information to the operator B40 is realized. Note that in a case in which the operator terminal 40 as the output destination of the command information is the operator terminal 40a that is a personal computer or the operator terminal 40b that is a smartphone, the operator terminal display control unit 680 may acquire the command information from the command DB 420 via the DB operation unit 610, for example, and output the command information to the operator terminal 40. The processing performed by the information processing device 10 proceeds to the processing in Step S612 after the processing in Step S608.

Meanwhile, in a case in which it is determined that the output destination of the command information is not the operator terminal 40 (Step S604/NO), the drive control unit 690 outputs the command information to the external device such as the drone 20 or the sensors 30 (Step S610). In this manner, the execution of the task by the external device is realized.

After the processing in Step S608 or Step S610, the communication unit 200 receives information indicating that the task has been completed from the operator terminal 40 or the external device such as the drone 20, which is the output destination of the command information. Then, the DB operation unit 610 updates the command DB 420 by registering the information in the command DB 420 (Step S612) and returns to the processing in Step S602.

[3-3. Farm Management Processing]

Figure 11:
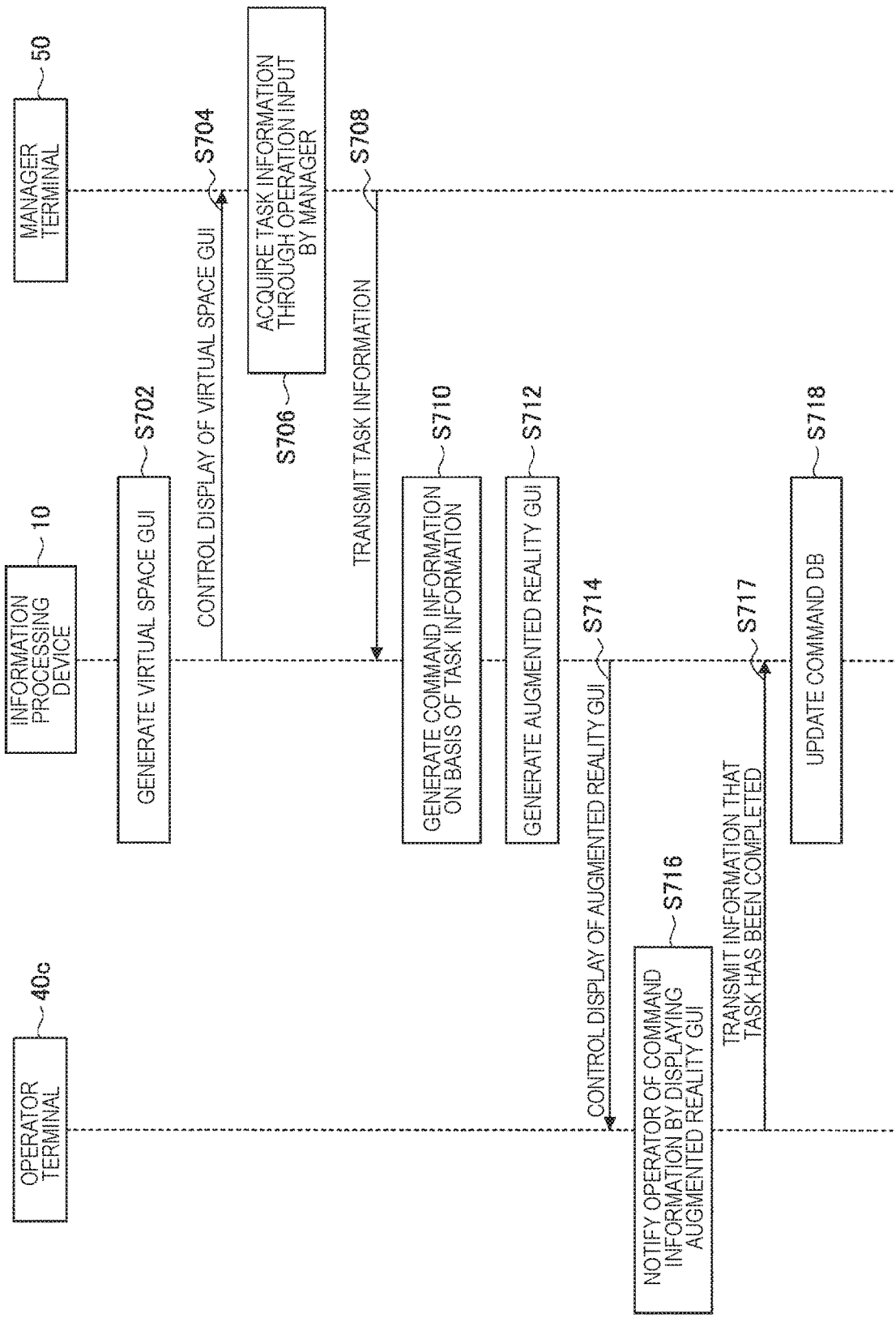
FIG. 11 is a flowchart illustrating an example of a flow of farm management processing which is performed by a farm management system according to the embodiment.

Next, a flow of farm management processing for managing the farm, which is performed by the farm management system 1, will be described with reference to FIG. 11 for facilitating understanding of a flow of processing performed by the farm management system 1 according to the embodiment as a whole system. FIG. 11 is a flowchart illustrating an example of a flow of the farm management processing performed by the farm management system 1 according to the embodiment. In FIG. 11, an example of the flow of the farm management processing in a case in which the task information is input in the manual mode and the output destination of the command information is the operator terminal 40c that corresponds to the head mounted display is illustrated.

In the farm management processing, the information processing device 10 generates a virtual space GUI including condition information indicating conditions of the cattle B30 first as illustrated in FIG. 11 (Step S702). Then, the information processing device 10 causes the generated virtual space GUI to be displayed on the manager terminal 50 (Step S704). Next, the manager terminal 50 acquires task information through an operation input by the manager B50 (Step S706). Then, the manager terminal 50 transmits the task information to the information processing device 10 (Step S708).

Next, the information processing device 10 generates command information for providing a command for the task indicated by the task information on the basis of the acquired task information (Step S710). Then, the information processing device 10 generates an augmented reality GUI including the command information (Step S712). Then, the information processing device 10 causes the augmented reality GUI to be displayed on the operator terminal 40c (Step S714). Next, the operator terminal 40 notifies the operator B40 of the command information by displaying the augmented reality GUI in such a manner in which the augmented reality GUI is overlaid on at least a part of the field of view of the operator B40 (Step S716). After the task is completed, the operator terminal 40 acquires information indicating that the task has been completed through an operation input by the operator B40 and transmits the information to the information processing device 10 (Step S717). Next, the information processing device 10 updates the command DB 420 by registering the information in the command DB 420 (Step S718) and returns to the processing in Step S702.

<4. Hardware Configuration>

The embodiment of the present disclosure has been described above. The above-described process by the information processing device 10 is realized by cooperation of software and hardware of the information processing device 10 to be described below.

Figure 12:
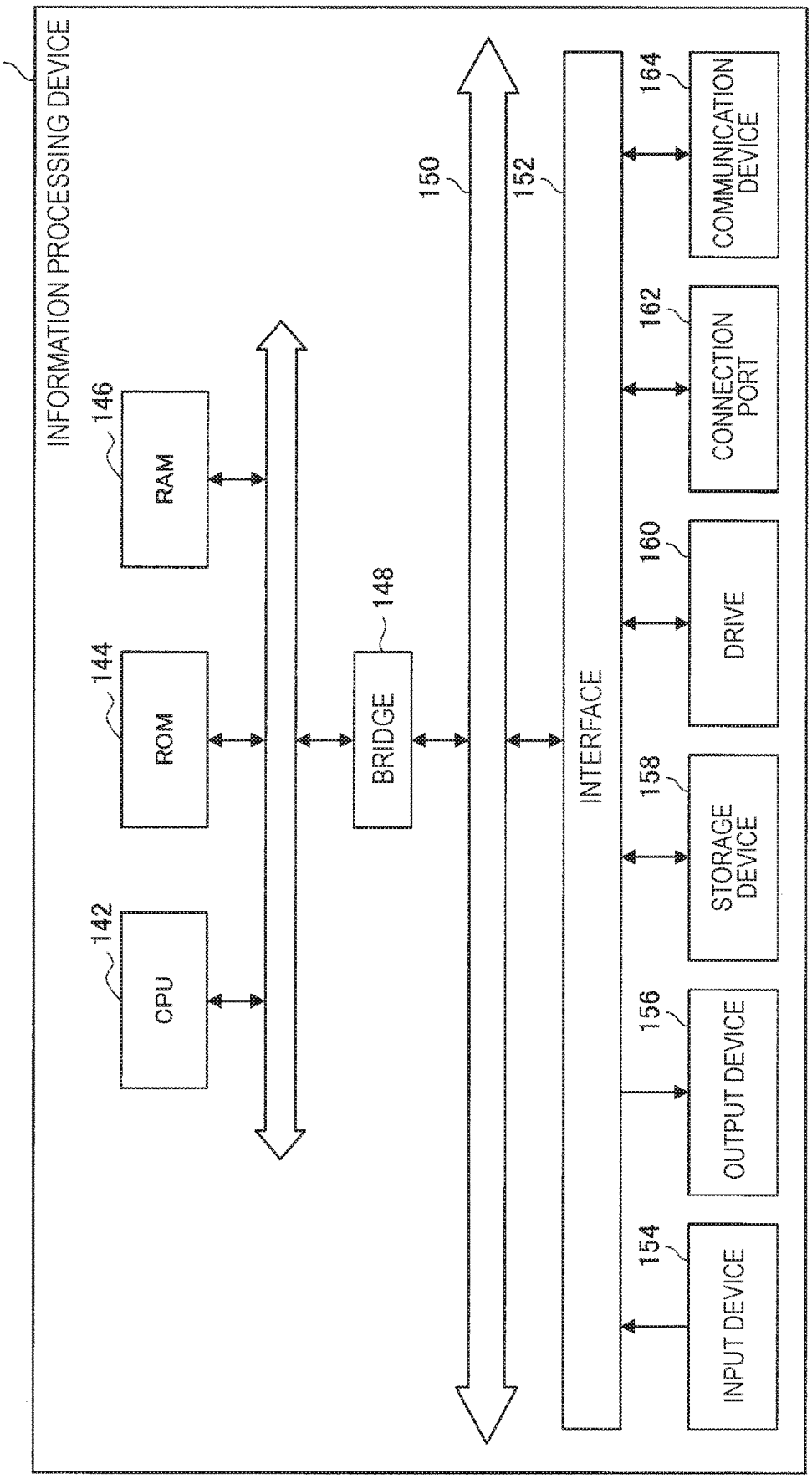
FIG. 12 is an explanatory diagram illustrating an example of a hardware configuration of the information processing device according to the present disclosure.

FIG. 12 is an explanatory diagram illustrating an example of a hardware configuration of the information processing device 10 according to the present disclosure. As illustrated in FIG. 12, the information processing device 10 includes a central processing unit (CPU) 142, a read-only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device, and realizes an operation of each functional configuration in the information processing device 10 in cooperation with various programs. Moreover, the CPU 142 may be a microprocessor. The ROM 144 stores arithmetic parameters, a program, and the like to be used by the CPU 142. The RAM 146 temporarily stores a program to be used for execution by the CPU 142 and parameters or the like appropriately changed in the execution. The CPU 142, the ROM 144, and the RAM 146 are connected to each other by an internal bus including a CPU bus.

The input device 154 is, for example, input means such as a mouse, a keyboard, a touch panel, a button, a microphone, a switch, and a lever used for an operator to input information and includes an input control circuit that generates an input signal on a basis of an input by the operator and outputs the input signal to the CPU 142. The operator of the information processing device 10 can instruct the information processing device 10 to input various kinds of data and perform a processing operation by manipulating the input device 154.

The output device 156 performs outputting to, for example, a device such as a liquid crystal display (LCD) device, an organic light-emitting diode (OLED) device, or a lamp. Further, the output device 156 may output sounds of a speaker, a headphone, and the like.

The storage device 158 is a data storage device. The storage device 158 may include a storage medium, a recording device that records data on the storage medium, a reading device that reads the data from the storage medium, and an erasure device that erases the data recorded on the storage medium. The storage device 158 stores various kinds of data or a program to be executed by the CPU 142.

The drive 160 is a storage medium reader and writer and is contained in the information processing device 10 or is externally attached. The drive 160 reads information recorded on a mounted magnetic disk, optical disc, magneto-optical disc, or removable storage medium such as a semiconductor memory and outputs the information to the RAM 144. Moreover, the drive 160 can also write information on the removable storage medium.

The connection port 162 is, for example, a bus for connection with an external information processing device or a peripheral device of the information processing device 10. Moreover, the connection port 162 may be a universal serial bus (USB).

The communication device 164 is, for example, a communication interface including a communication device for connection to a network. Moreover, the communication device 164 may be an infrared communication-compatible device, a wireless Local Area Network (LAN)-compatible communication device, a Long Term Evolution (LTE)-compatible communication device, or a wired communication device performing wired communication.

It is possible to create a computer program for realizing the aforementioned respective functions of the information processing device 10 according to the embodiment and to install the computer program on the PC or the like. The information processing device 10 according to the embodiment can correspond to the computer according to the present disclosure. In addition, it is possible to provide a computer readable recording medium in which such a computer program is stored. The recording medium is, for example, a magnetic disk, an optical disc, a magneto-optical disc, a flash memory, or the like. In addition, the above computer program may be distributed via a network, for example, without using the recording medium. Also, the respective functions of the information processing device 10 according to the embodiment may be divided by a plurality of computers, and in that case, the respective functions that the plurality of computers have can be realized by the above computer program.

<5. Conclusion>

As described above, according to the embodiment of the present disclosure, the information processing device 10 controls the display of the condition information indicating the conditions of the cattle B30, acquires the task information indicating the task related to the cattle B30 input on the basis of the condition information, and outputs the command information for providing a command for the task indicated by the task information. In this manner, it is possible to realize appropriate execution of the task in accordance with the actual conditions of the cattle B30 while reducing the personnel burden. Therefore, it is possible to further improve the efficiency of the management of the cattle B30 according to the information processing device 10 of the embodiment.

Although the example in which the operations for viewing the conditions of the cattle B30 and inputting the task information indicating the task related to the cattle B30 through utilization of the virtual space GUI displayed on the manager terminal 50 are performed by the manager B50 of the farm has been described above, the operations utilizing the virtual space GUI may be performed by another user. The information processing device 10 may cause the virtual space GUI to be displayed on a terminal that another user uses, for example. In this manner, it is possible to take advantage of the operations performed by another user using the virtual space GUI for online games, education, or sightseeing. In this manner, it is possible to realize virtual sightseeing experiments, training of persons unskilled in livestock management, and the like. In addition, the operations utilizing the virtual space GUI may be performed by a user such as a veterinary positioned at a remote location from the farm, a specialist related to livestock, an owner of livestock, a general worker, or the like.

In addition, the point in which the information obtained by the drone 20 performing the image processing on the image obtained by image capturing may be transmitted to the information processing device 10 has been described above. In addition, the point in which the sensor 30 may transmit the information obtained by performing arithmetic processing on the detected physical amounts as the detection results to the information processing device 10 has been described. Such image processing performed by the drone 20 and arithmetic processing performed by the sensor 30 as described above may be performed on the side of the information processing device 10.

In addition, although the example in which the information processing device 10 is a device that is different from the operator terminal 40 and the manager terminal 50 has been described above, the technical scope of the present disclosure is not limited to such an example. For example, the functions that the information processing device 10 has may be realized by the operator terminal 40 or may be realized by the manager terminal 50.

In addition, the series of control processes by each device described in the present specification may be realized using one of software, hardware, and a combination of the software and the hardware. For example, a program including the software is stored in advance on a storage medium (non-transitory media) provided internally or externally in each device. Then, for example, each program is read to the RAM at the time of execution and is executed by a processor such as the CPU. One processor or a plurality of processors may be provided to execute the respective programs.

Moreover, the process described using the flowchart in the present specification may not necessarily be performed in the order shown in the flowchart. Several processing steps may be performed in parallel. Moreover, additional processing steps may be adopted or some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a display control unit that controls display of condition information indicating conditions of livestock;
an acquisition unit that acquires task information indicating a task related to the livestock, which is input on a basis of the condition information; and
an output unit that outputs command information for providing a command for the task indicated by the task information.

(2)
The information processing device according to (1), in which the display control unit causes a virtual space to be displayed in a manner in which a position of the livestock in a real space is associated with a position of the livestock in the virtual space.

(3)
The information processing device according to (2), in which the display control unit causes the virtual space to be displayed in a manner in which the virtual space corresponding to each of a plurality of times is switched.

(4)
The information processing device according to (2) or (3), in which the display control unit causes the virtual space viewed from above to be displayed.

(5)
The information processing device according to any one of (2) to (4), in which the display control unit causes the virtual space viewed from the ground to be displayed.

(6)
The information processing device according to any one of (1) to (5), in which the display control unit causes a plurality of candidates for the task related to the livestock generated on the basis of the condition information to be displayed.

(7)
The information processing device according to any one of (1) to (6), in which the output unit notifies a user of the command information by outputting the command information to a communication device that the user uses.

(8)
The information processing device according to (7), in which the communication device displays the command information by causing the command information to be overlaid on at least a part of a field of view of the user.

(9)
The information processing device according to any one of (1) to (8), in which the output unit controls execution of the task by an external device, by outputting the command information to the external device.

(10)
The information processing device according to (9), in which the external device includes a mobile object.

(11)
The information processing device according to (9) or (10), in which the external device includes a sensor.

(12)
The information processing device according to any one of (1) to (11), further including:
a task information generation unit that generates the task information on the basis of the condition information.

(13)
The information processing device according to any one of (1) to (12), further including:
a condition information generation unit that generates, on a basis of first condition information included in the condition information, second condition information, which is condition information indicating a condition that is different from a condition corresponding to the first condition information.

(14)
The information processing device according to any one of (1) to (13), further including:
a database operation unit that updates a condition database in which a time at which the condition information is acquired is linked to the condition information and a command database in which a time at which the command information is output is linked to the command information.

(15)
An information processing method including:
controlling, by an information processing device, display of condition information indicating conditions of livestock;
acquiring task information indicating a task related to the livestock, which is input on a basis of the condition information; and
outputting command information for providing a command for the task indicated by the task information.

(16)
A program causing a computer to function as:
a display control unit that controls display of condition information indicating conditions of livestock;
an acquisition unit that acquires task information indicating a task related to the livestock, which is input on a basis of the condition information; and
an output unit that outputs command information for providing a command for the task indicated by the task information.

REFERENCE SIGNS LIST 1 farm management system
10 information processing device
20 drone
30 sensor
40, 40a, 40b, 40c operator terminal
50 manager terminal
142 CPU
144 ROM
146 RAM
148 bridge
150 bus
152 interface
154 input device
156 output device
158 storage device
160 drive 162 connection port
164 communication device
200 communication unit
400 storage unit
410 condition DB
420 command DB
600 control unit
610 DB operation unit
620 condition information generation unit
630 virtual space GUI generation unit
640 manager terminal display control unit
650 task information generation unit
660 command information generation unit
670 augmented reality GUI generation unit
680 operator terminal display control unit
690 drive control unit
910 real space task unit
920 virtual space operation unit
930 system control unit
940 storage unit

The invention claimed is:

1. An information processing device, comprising:
a processor configured to:
acquire condition information that indicates a plurality of conditions associated with livestock;
control display of the acquired condition information on a first external device;
acquire task information from the first external device based on the display of the acquired condition information on the first external device, wherein the acquired task information indicates a task related to the livestock;
generate command information based on the acquired task information, wherein the generated command information indicates a command associated with the task;
determine a specific external device from a plurality of second external devices based on the acquired condition information; and
output the generated command information to the determined specific external device.

2. The information processing device according to claim 1, wherein
the processor is further configured to control display of a virtual space on the first external device, and
a position of the livestock in a real space is associated with a position of the livestock in the virtual space.

3. The information processing device according to claim 2, wherein
the processor is further configured to switch the display of the virtual space corresponding to each time instant of a plurality of time instants.

4. The information processing device according to claim 2, wherein
the virtual space corresponds to a view of the real space from above an area associated with the livestock.

5. The information processing device according to claim 2, wherein
the virtual space corresponds to a view of the real space from a ground level of an area associated with the livestock.

6. The information processing device according to claim 1, wherein
the processor is further configured to:
generate a plurality of candidates based on the acquired condition information; and
control display of the generated plurality of candidates on the first external device, and
the plurality of candidates is associated with the task related to the livestock.

7. The information processing device according to claim 1, wherein
the processor is further configured to notify a user based on the generated command information, and
the user is associated with the specific external device.

8. The information processing device according to claim 7, wherein
the processor is further configured to control superimposition of the generated command information on at least a part of a user field of view, and
the specific external device displays the superimposed command information.

9. The information processing device according to claim 1, wherein
the processor is further configured to control execution of the task, and
the task is executed by the specific external device based on the generated command information.

10. The information processing device according to claim 9, wherein the plurality of second external devices includes a mobile object.

11. The information processing device according to claim 9, wherein the plurality of second external devices includes a sensor.

12. The information processing device according to claim 1, wherein
the processor is further configured to generate a new condition associated with the livestock based on the acquired condition information, and
the new condition is different from the plurality of conditions of the livestock.

13. The information processing device according to claim 1, wherein
the processor is further configured to update each of a condition database and a command database,
the condition database includes the acquired condition information and a time of the acquisition of the condition information, and
the command database includes the generated command information and a time of the generation of the command information.

14. An information processing method, comprising:
acquiring condition information that indicates a plurality of conditions associated with livestock;
controlling display of the acquired condition information on a first external device;
acquiring task information from the first external device based on the display of the acquired condition information on the first external device, wherein the acquired task information indicates a task related to the livestock;
generating command information based on the acquired task information, wherein the generated command information indicates a command associated with the task;
determining a specific external device from a plurality of second external devices based on the acquired condition information; and
outputting the generated command information to the determined specific external device.

15. A non-transitory computer-readable medium having stored thereon computer-executable instructions which, when executed by at least one processor, cause the at least one processor to execute operations, the operations comprising:
  acquiring condition information that indicates a plurality of conditions associated with livestock;
  controlling display of the acquired condition information on a first external device;
  acquiring task information from the first external device based on the display of the acquired condition information on the first external device, wherein the acquired task information indicates a task related to the livestock;
  generating command information based on the acquired task information, wherein the generated command information indicates a command associated with the task;
  determining a specific external device from a plurality of second external devices based on the acquired condition information; and
  outputting the generated command information to the determined specific external device.

* * * * *